(12) United States Patent
Brauch et al.

(10) Patent No.: US 7,981,302 B2
(45) Date of Patent: Jul. 19, 2011

(54) METHOD AND APPARATUS FOR ENHANCED SETTLING AND COLLECTION OF SETTLED MATERIAL

(75) Inventors: Joseph Karl Brauch, Aurora, CO (US); Charles Lonnie Meurer, Golden, CO (US)

(73) Assignee: Meurer Research Inc., Golden, CO (US)

( * ) Notice: Subject to any disclaimer, the term of this patent is extended or adjusted under 35 U.S.C. 154(b) by 0 days.

(21) Appl. No.: 12/862,671

(22) Filed: Aug. 24, 2010

(65) Prior Publication Data

US 2010/0314336 A1 Dec. 16, 2010

Related U.S. Application Data

(63) Continuation of application No. 11/510,469, filed on Aug. 24, 2006, now Pat. No. 7,780,015.

(51) Int. Cl.
*B01D 21/04* (2006.01)

(52) U.S. Cl. ..... 210/803; 210/527; 210/541; 198/621.1; 198/622; 198/747

(58) Field of Classification Search .................. 210/803, 210/523, 524, 525, 527, 532.1, 541; 198/621.1, 198/622, 747

See application file for complete search history.

(56) References Cited

U.S. PATENT DOCUMENTS

| | | | |
|---|---|---|---|
| 630,962 A | 8/1899 | Wood | |
| 747,113 A | 12/1903 | Allen | |
| 748,981 A | 1/1904 | Oliver | |
| 1,102,463 A | 7/1914 | Wyckoff | |
| 1,493,861 A | 5/1924 | Raymond | |
| 1,543,621 A | 6/1925 | Ruckstuhl | |
| 1,557,340 A | 10/1925 | Sandmann | |
| 1,703,967 A | 3/1929 | Sperr, Jr. | |
| 1,717,713 A | 6/1929 | Logan | |
| 1,793,510 A | 2/1931 | Raymond | |
| 1,892,648 A * | 12/1932 | Bousman | 210/527 |
| 1,918,742 A * | 7/1933 | Elrod | 210/527 |
| 2,085,150 A * | 6/1937 | Gemeny | 210/527 |

(Continued)

FOREIGN PATENT DOCUMENTS

FR 1254225 2/1961

(Continued)

OTHER PUBLICATIONS

U.S. Appl. No. 12/862,693, filed Aug. 24, 2010, Brauch et al.

(Continued)

*Primary Examiner* — Christopher Upton
(74) *Attorney, Agent, or Firm* — Sheridan Ross P.C.

(57) ABSTRACT

Apparatus and methods provide individual blades driven by drives configured to reduce a tendency of sludge to be moved in an undesired return direction. Drive configurations apply "pull" and "pull" forces that only pull on tensile structures, avoiding a need in actual commercial practice for use of extra structural drive members having high resistance to both tension and compressive forces exerted parallel to a sludge movement direction. Each of two separate tensile structures carries one blade, or a separate set of blades, with blade(s) of one structure adjacent to, and alternating with, blade(s) of the other structure. Embodiments move sludge from a corner of a basin and across a floor of the basin. The reduced tendency of sludge movement in the return direction results from moving one tensile structure and blade(s) in the sludge movement direction as the other tensile structure and adjacent opposed blade(s) move in the return direction.

13 Claims, 19 Drawing Sheets

U.S. PATENT DOCUMENTS

| | | | | |
|---|---|---|---|---|
| 2,101,079 A | * | 12/1937 | Lund | 210/527 |
| 2,101,080 A | * | 12/1937 | Lund | 210/527 |
| 2,144,385 A | | 1/1939 | Nordell | |
| 2,242,139 A | | 5/1941 | Monroe | |
| 2,302,450 A | | 11/1942 | Laughlin | |
| 2,314,977 A | | 3/1943 | Green | |
| 2,328,655 A | | 9/1943 | Lannert | |
| 2,379,615 A | | 7/1945 | Walker | |
| 2,502,187 A | | 3/1950 | Wahlgren | |
| 2,589,882 A | | 3/1952 | Sinner et al. | |
| 2,640,682 A | | 6/1953 | Votypka | |
| 2,650,810 A | | 9/1953 | Nordell | |
| 2,684,330 A | | 7/1954 | French | |
| 2,866,557 A | | 12/1958 | Easterday | |
| 2,897,967 A | | 8/1959 | Arthur | |
| 2,930,485 A | | 3/1960 | Nordell | |
| 2,947,525 A | | 8/1960 | Klein | |
| 2,997,284 A | | 8/1961 | Nechine | |
| 3,063,689 A | | 11/1961 | Coppock | |
| 3,083,953 A | | 4/1963 | Langdon et al. | |
| 3,134,324 A | | 5/1964 | Schwaninger | |
| 3,321,185 A | | 5/1967 | Zenke | |
| 3,333,704 A | | 8/1967 | McGivern | |
| 3,353,683 A | * | 11/1967 | Geiger | 210/527 |
| 3,416,176 A | | 12/1968 | Ravitts | |
| 3,494,462 A | | 2/1970 | Baud | |
| 3,613,564 A | | 10/1971 | Adamski | |
| 3,613,889 A | | 10/1971 | Reed | |
| 3,616,651 A | | 11/1971 | Chang et al. | |
| 3,669,271 A | | 6/1972 | McGivern | |
| 3,706,384 A | | 12/1972 | Weijman-Hane | |
| 3,707,737 A | | 1/1973 | Brower | |
| 3,802,676 A | | 4/1974 | Thayer | |
| 3,846,291 A | | 11/1974 | Brucker | |
| 3,864,441 A | | 2/1975 | Sizuki | |
| 3,872,960 A | | 3/1975 | Gabor | |
| 3,880,965 A | | 4/1975 | Dudis et al. | |
| 3,903,000 A | | 9/1975 | Miura et al. | |
| 3,925,205 A | | 12/1975 | Sparham | |
| 3,963,624 A | | 6/1976 | Henderson et al. | |
| 3,980,561 A | | 9/1976 | Miyagl et al. | |
| 3,985,207 A | | 10/1976 | Petit | |
| 4,002,105 A | | 1/1977 | Bell | |
| 4,048,267 A | | 9/1977 | Walker et al. | |
| 4,071,443 A | | 1/1978 | Gorski et al. | |
| 4,090,966 A | * | 5/1978 | Clendenen | 210/527 |
| 4,136,012 A | | 1/1979 | Louboutin et al. | |
| 4,148,731 A | | 4/1979 | Brigante | |
| 4,193,871 A | | 3/1980 | White et al. | |
| 4,194,976 A | | 3/1980 | Robinsky | |
| 4,198,871 A | | 4/1980 | Dunn et al. | |
| 4,221,671 A | | 9/1980 | Meurer | |
| 4,245,396 A | | 1/1981 | Maffet | |
| 4,246,102 A | | 1/1981 | Hjelmner et al. | |
| 4,294,696 A | | 10/1981 | Thayer | |
| 4,346,005 A | | 8/1982 | Zimmerman | |
| 4,401,335 A | | 8/1983 | Godbersen | |
| 4,401,576 A | | 8/1983 | Meurer | |
| 4,431,597 A | | 2/1984 | Cramer et al. | |
| 4,477,939 A | | 10/1984 | White et al. | |
| 4,514,303 A | * | 4/1985 | Moore | 210/525 |
| 4,551,246 A | | 11/1985 | Coffing | |
| 4,555,340 A | | 11/1985 | Boyle | |
| 4,734,193 A | * | 3/1988 | Cvitas et al. | 210/527 |
| 4,859,327 A | | 8/1989 | Cox et al. | |
| 4,865,753 A | | 9/1989 | Meurer | |
| 4,886,605 A | | 12/1989 | Herve | |
| 4,889,624 A | | 12/1989 | Soriente et al. | |
| 4,926,973 A | | 5/1990 | Smith | |
| 4,957,014 A | | 9/1990 | Burke | |
| 4,957,628 A | | 9/1990 | Schulz | |
| 4,960,546 A | | 10/1990 | Tharp | |
| 4,986,141 A | * | 1/1991 | Meurer | 74/89.22 |
| 4,988,441 A | | 1/1991 | Moir | |
| 5,013,435 A | | 5/1991 | Rider et al. | |
| 5,013,493 A | | 5/1991 | Tharp | |
| 5,018,925 A | | 5/1991 | Ganser | |
| 5,021,153 A | | 6/1991 | Haws | |
| 5,059,312 A | | 10/1991 | Galetti | |
| 5,087,391 A | | 2/1992 | Brown | |
| 5,101,849 A | | 4/1992 | Richard | |
| 5,116,443 A | | 5/1992 | Meurer | |
| 5,120,436 A | | 6/1992 | Reichner | |
| 5,125,931 A | | 6/1992 | Schulz | |
| 5,132,010 A | | 7/1992 | Ossenhop | |
| 5,143,625 A | | 9/1992 | Ballard | |
| 5,160,460 A | | 11/1992 | Goetz et al. | |
| 5,204,000 A | | 4/1993 | Steadman et al. | |
| 5,217,614 A | | 6/1993 | Meurer | |
| 5,290,487 A | | 3/1994 | Ludwig | |
| 5,300,232 A | | 4/1994 | Barrington et al. | |
| 5,366,638 A | | 11/1994 | Moore | |
| 5,378,378 A | | 1/1995 | Meurer | |
| 5,388,480 A | | 2/1995 | Townsend | |
| 5,391,306 A | | 2/1995 | Meurer | |
| 5,427,471 A | | 6/1995 | Godbersen | |
| 5,431,818 A | * | 7/1995 | Zickert | 210/527 |
| 5,435,924 A | | 7/1995 | Albertson | |
| 5,497,854 A | | 3/1996 | Fang | |
| 5,510,025 A | | 4/1996 | Benesi | |
| 5,552,050 A | | 9/1996 | Valentin | |
| 5,655,727 A | * | 8/1997 | Hanson et al. | 210/803 |
| 5,692,435 A | | 12/1997 | Nissen | |
| 5,693,218 A | | 12/1997 | Yamamoto | |
| 5,804,104 A | | 9/1998 | Brauch et al. | |
| 5,830,356 A | | 11/1998 | Kauppila | |
| 5,945,040 A | | 8/1999 | Brauch et al. | |
| 6,045,709 A | | 4/2000 | Roberts | |
| 6,158,142 A | | 12/2000 | Brauch et al. | |
| 6,234,323 B1 | | 5/2001 | Sarrouh | |
| 6,245,243 B1 | | 6/2001 | Meurer | |
| 6,497,249 B1 | | 12/2002 | Swan et al. | |
| 6,951,620 B2 | | 10/2005 | Brauch et al. | |
| 7,021,472 B1 | | 4/2006 | Meurer | |
| 7,780,015 B1 | | 8/2010 | Brauch et al. | |
| 2002/0121476 A1 | * | 9/2002 | Wang | 210/527 |

FOREIGN PATENT DOCUMENTS

| | | |
|---|---|---|
| GB | 742315 | 12/1955 |
| GB | 1329599 | 9/1973 |

OTHER PUBLICATIONS

Hazen, A.; On Sedimentation, 1904, Transactions of the American Society of Civil Engineers, vol. 53, pp. 45-88.

* cited by examiner

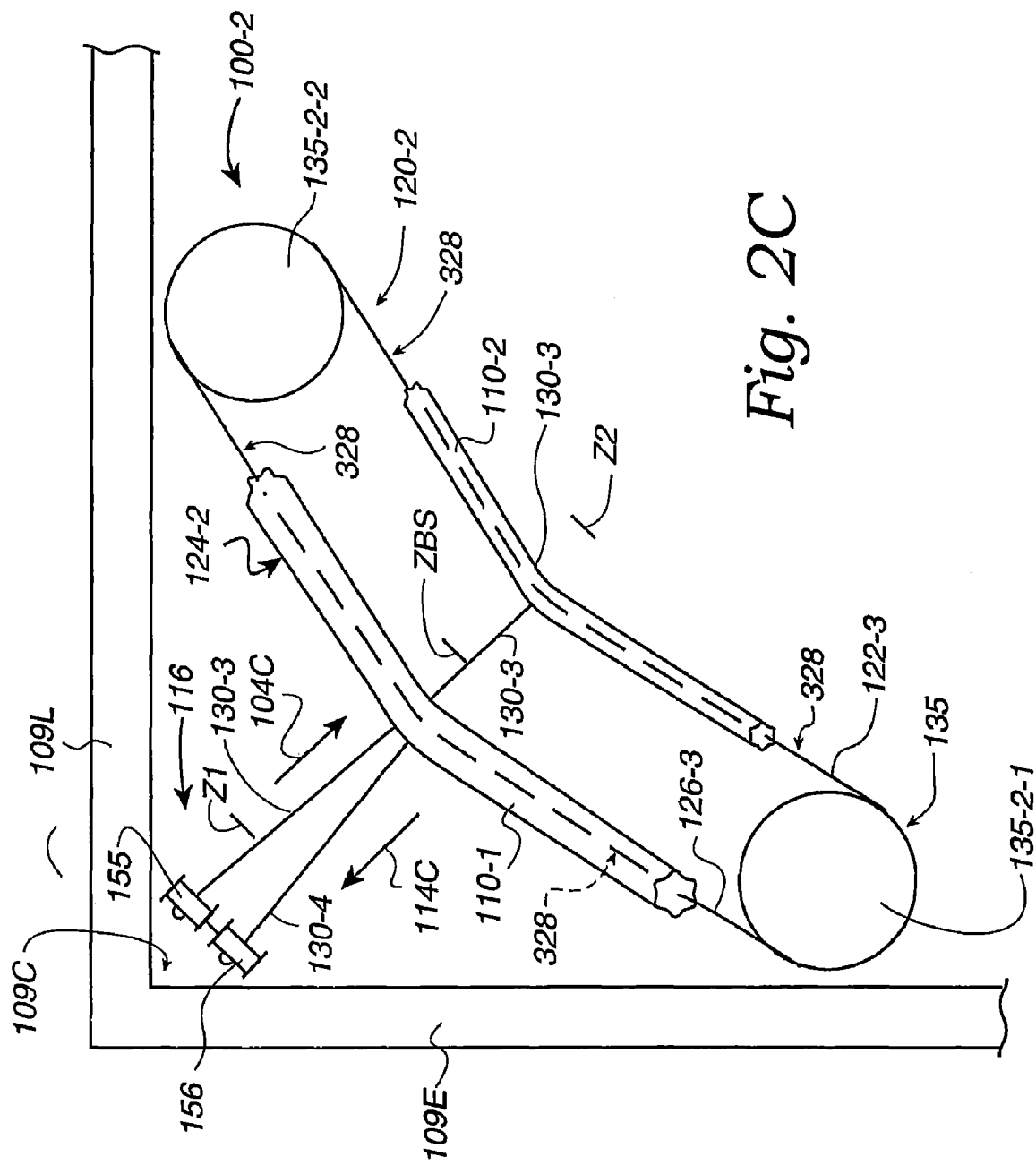

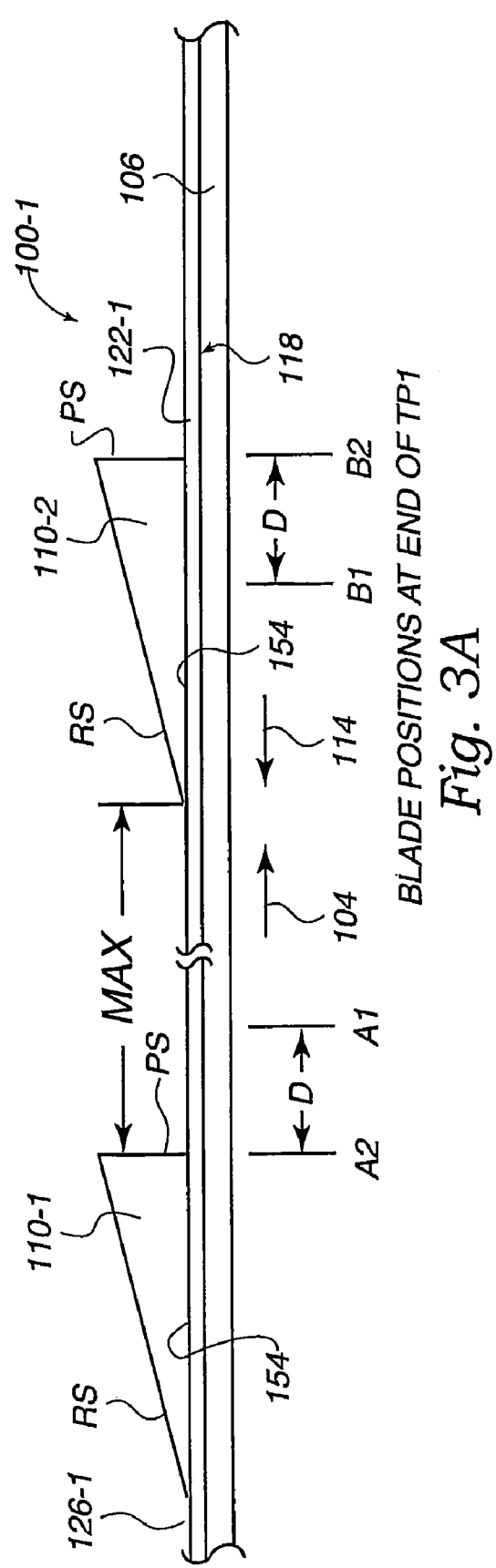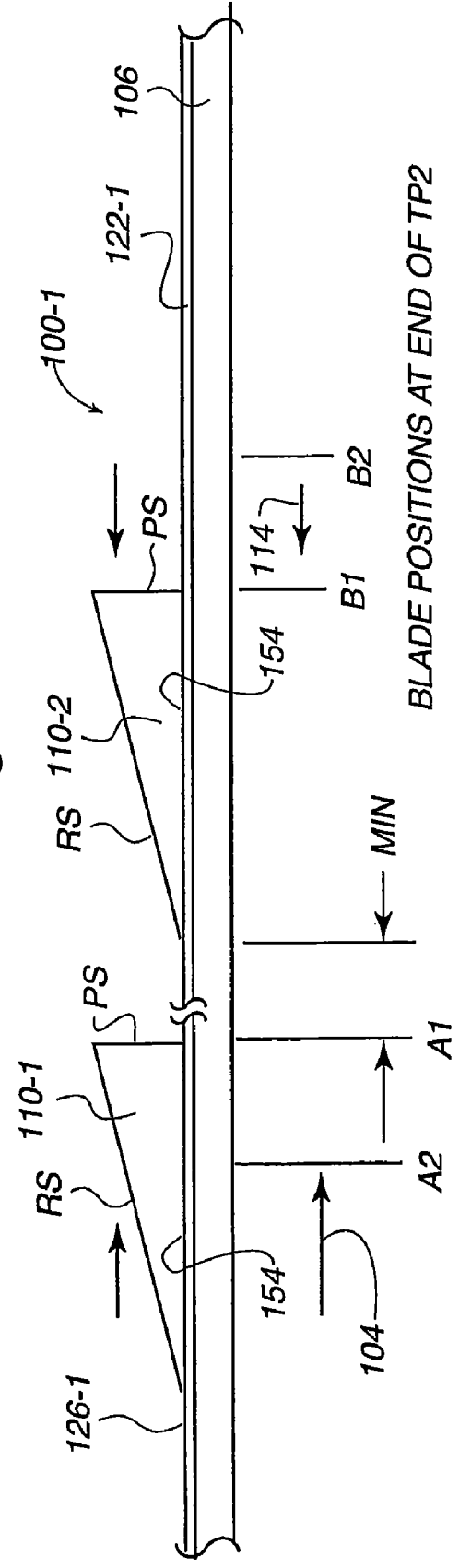

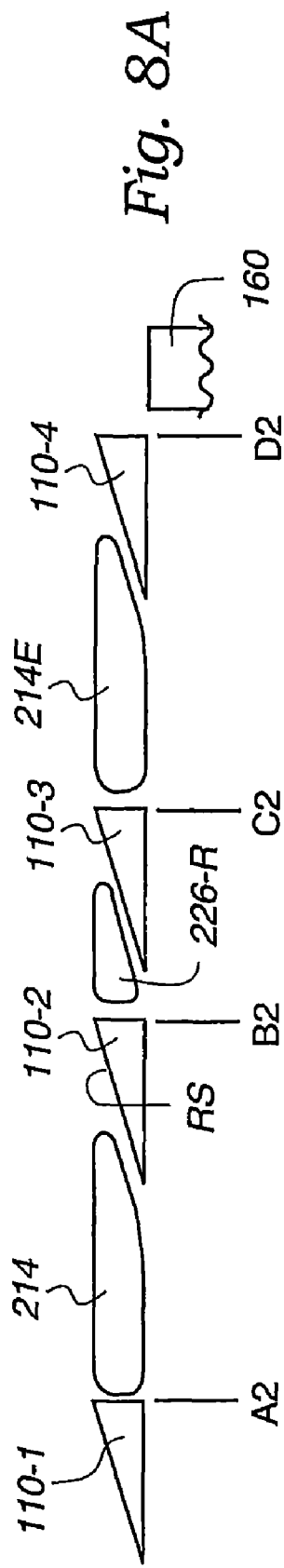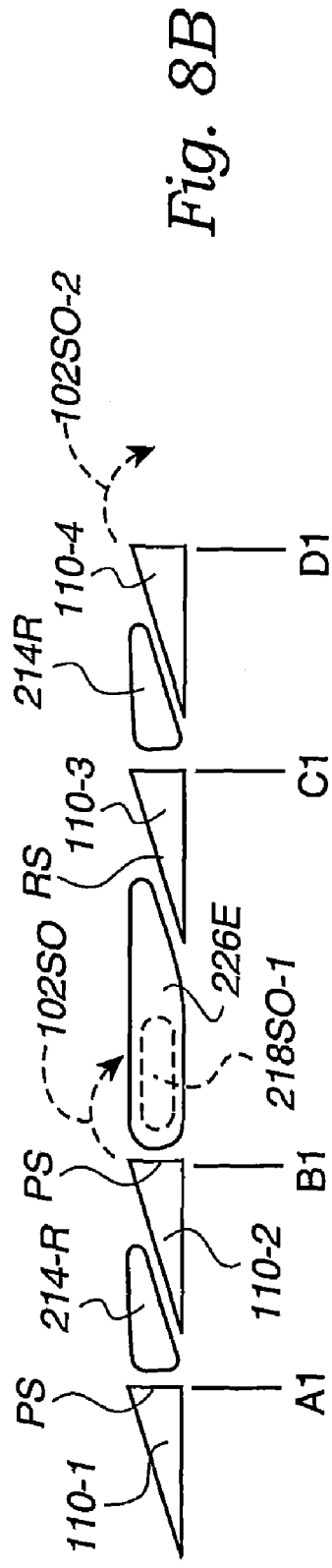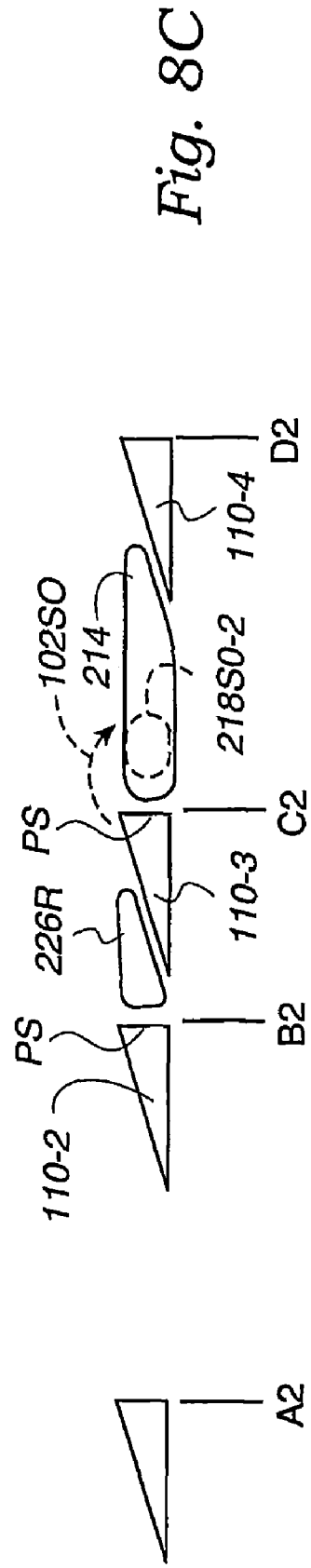

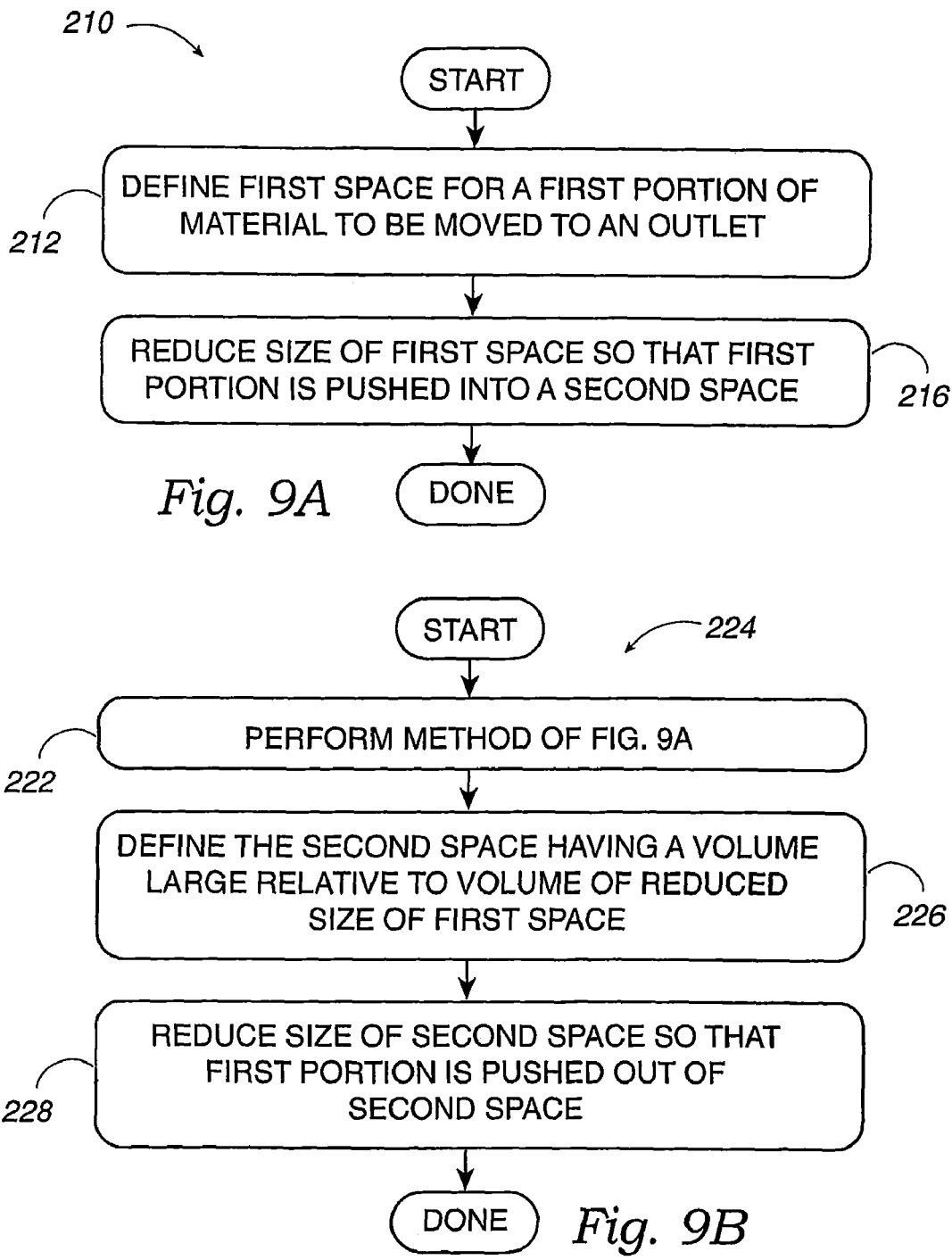

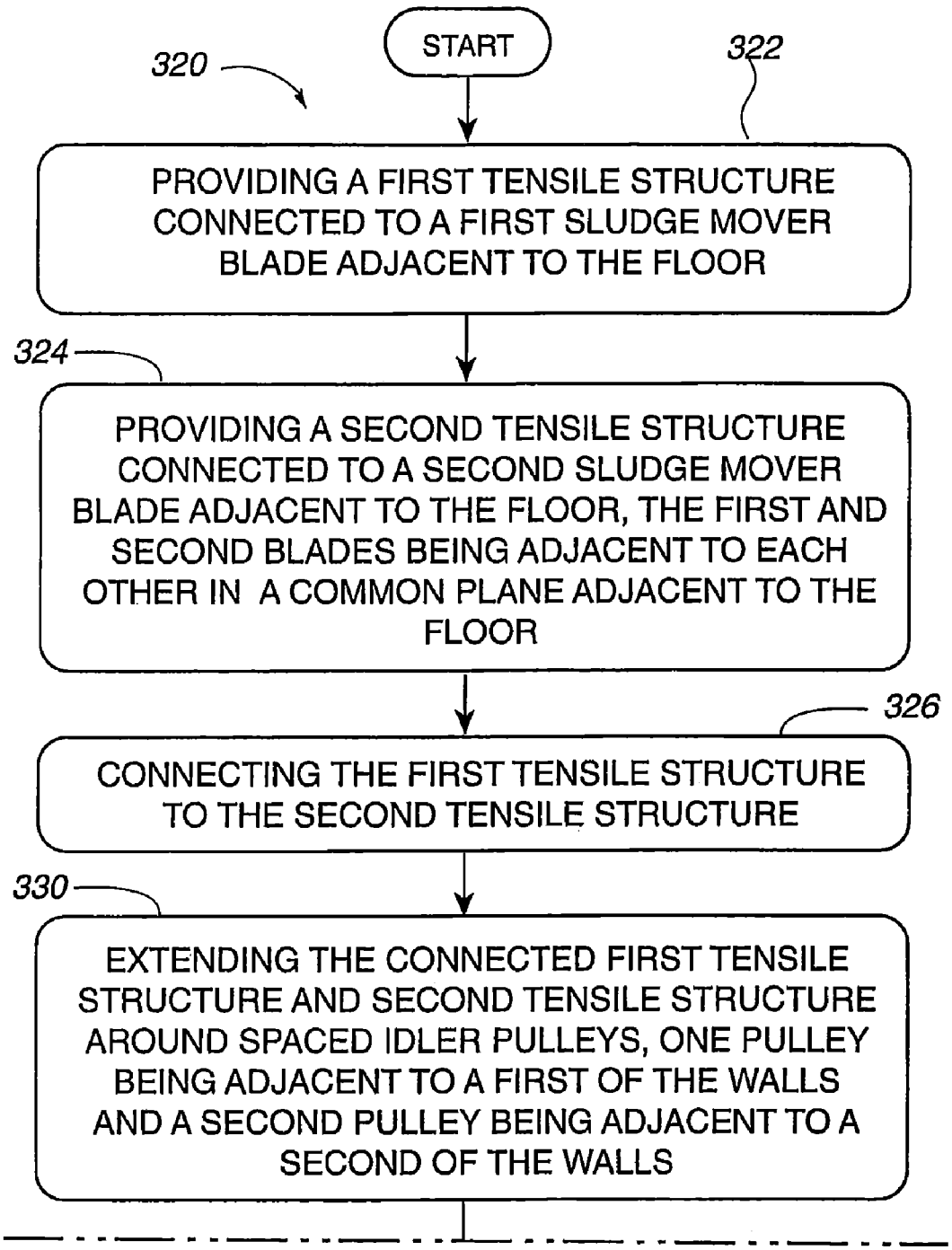

METHOD AND APPARATUS FOR ENHANCED SETTLING AND COLLECTION OF SETTLED MATERIAL

CROSS-REFERENCE TO RELATED APPLICATIONS

This is a continuation patent application which claims priority from U.S. Utility patent application Ser. No. 11/510,469, entitled "METHODS OF AND SLUDGE COLLECTOR WITH ADJACENT OPPOSED OPPOSITELY-MOVING BLADES FOR MOVING SLUDGE IN A BASIN," filed on Aug. 24, 2006, which is herein incorporated by reference in its entirety.

BACKGROUND

1. Field

The present invention relates generally to removing materials from liquids, and more particularly to adjacent opposed, oppositely moving blades for, and methods of, moving sludge in a sludge collection basin for removal of the sludge from the basin.

2. Description of the Related Art

In the past, containers (e.g., basins or tanks) have been provided to house apparatus in which materials are collected. The materials may have any of a wide variety of compositions, and generally consist of pieces of the materials that move under the force of gravity to the bottom (or floor) of the basin ("settleable-particles"). For example, in municipal waste water systems, the materials may be formerly biologically-active waste materials that are no longer biologically-active, and that are in the form of the settleable-particles.

For ease of description, materials within the wide range of compositions and that consist of the settleable-particles, are referred to as "particles", and in the context of particles that have settled, or moved, to the bottom of the basin, such materials are referred to as "sludge".

The settleable-particles may be collected from liquids by plate or tube settlers that promote settling of the settleable-particles to the bottom of the basin. In other cases, flocculators may be housed in such containers. Settleable-particles often inadvertently move in the flocculators to the bottom of the basin. Because the flocculators are designed to circulate liquid and materials, rather than to promote settling of the materials, the materials that inadvertently collect at the bottom of the basin present a problem.

In the case of the settlers, for example, the sludge must be removed from the bottom to make room for more sludge collected from more liquid and materials that flow into the basin. In the past, sludge removal equipment has been mounted on or near the bottom for moving the sludge along the bottom to sludge outlets that allow removal of the sludge from the basin. The moving has been done by scrapers that are mounted together for traverse together from one end of the basin to an opposite end of the basin. On each traverse in one direction, each of the scrapers pushes sludge in the same direction to the outlet at one end. On each reverse traverse in the opposite direction, each of the scrapers pushes sludge to the outlet at the other end. In this scraper system, the scrapers must be able to push the sludge in each of the directions, and move together in the respective direction to perform the pushing.

Others have attempted to use scrapers of a different design, in which the scrapers need only be able to push the sludge in one direction across the bottom while moving together in the one direction to perform the pushing. In the use of these different scrapers, such as those described in U.S. Pat. No. 5,431,818 to K. D. Zickert issued Jul. 11, 1995, the distance through which each of the scrapers is moved has been greatly reduced, e.g., to about two feet. Problems are described in that patent in the use of a wedge-shaped scraper having a generally right-triangular cross-section, such as the scrapers 30 shown in FIGS. 1A and 1B. Many such scrapers 30 are attached to one net 32. The one net 32 is moved in a "to" (forward, sludge-moving direction, arrow 34) and in a "fro" (return, or reverse direction, arrow 36) reversing traverse. In this manner, the one net 32 moves all of the scrapers 30 together in one time period (TP) through the two foot distance in one direction (e.g., the forward, "to", direction 34, FIG. 1A). The one net 32 then reverses, and moves all of the scrapers 30 together in a next TP through the same two foot distance in the opposite direction (arrows 36, FIG. 1B).

In an effort to increase the efficiency of sludge movement in the forward direction 34, in U.S. Pat. No. 5,431,818 the cross-section of the scrapers 30 was modified, and all of the modified scrapers 40 (FIGS. 1C and 1D) were moved together in the same "to" direction 34 and together in the "fro" direction 36 at controlled speeds in the same time periods. Unfortunately, that cross-section of the modified scrapers 40 was made more complex by the selection of a curved configuration 41 shown in FIGS. 1C and 1D. That configuration 41 was described as a downwardly facing bottom surface 42, a substantially oblique, convex surface 44, and a substantially vertical, concave surface 46 facing in the forward direction (arrow 34). The complex, modified scraper 40 was said to minimize turbulence.

However, Applicant's analysis of the complex modified scraper 40 indicates that those advantages may be offset (i.e., substantially reduced) by many factors. One such factor is the movement of all of the scrapers 40 together (i.e., in the same direction at the same time). Applicant's analysis indicates that there is a tendency, for example, for undesired movement of the sludge in the return direction 36 due to all of the scrapers 40 moving together (at the same time in the return direction 36), which tendency is also promoted by the one net 32 attached to and moving with all of the blades. The undesired movement in the return direction reduces the efficiency of the desired movement in the "to" (or forward) direction.

Also, although the one net 32 is described in U.S. Pat. No. 5,431,818 as being pulled in the forward direction 34, and as being pulled in the return direction 36 (as by a spring), there are commercial embodiments that appear similar to the above-described system that uses the complex modified scrapers 40. Those commercial embodiments have the one net 32 reinforced and driven by a structural drive member (not shown) that has high resistance to both tension and compressive forces exerted parallel to the directions 34 and 36. Thus, in commercial practice, an extra structural member has been used to apply respective "to" and "fro" forces to the one net 42 to cause the to and fro motion. Such an extra structural member has increased the cost and weight of those commercial embodiments, and the extra weight increases the required energy (e.g., electrical power and thus operating cost) to move the scrapers.

Applicant's analysis further indicates another disadvantage of the substantially oblique, convex surface 44 (or the right-triangular cross-section of the blades 30), in combination with all of the modified scrapers 40 (or all of the scrapers 30) moved together in the same "to" direction 34 and together in the "fro" direction 36 in the same time periods. As noted, this structure and movement results in undesired movement of the sludge in the return direction 36 due to all of the scrapers moving together (at the same time in the return direction 36). In an apparent attempt to reduce the undesired movement of the sludge in the return direction 36, the U.S. Pat. No. 5,431,818 teaches use of a higher speed for the return stroke than for the forward stroke (e.g., 12 m/minute return vs., 3 m/minute forward). Such a higher speed return stroke can agitate the particles of the sludge causing some of the particles to be reintroduced into the liquid that was clarified by the settler, for example. This further reduces the efficiency of the overall operations because the reintroduced particles have to be again settled and then removed from the basin.

Applicant's analysis further indicates yet another disadvantage of all of the scrapers 30 or 40 moving together in the same "to" direction 34 and together in the same "fro" direction 36 in the same time respective periods. All of the prior push surfaces (e.g., 46) engage and push the sludge at the same time and are thus resisted by the sludge at the same time. The requirement for higher power for this pushing of all blades together at the same time, and the increased weight of the extra compressive member that enables pushing instead of pulling the structure, result in the motor used for moving the system being more costly than a lower-power motor. Also, such extra compressive member makes the net 32 less compliant with respect to uneven floors of the basin, which in turn results in higher costs to initially provide a smoother floor for the basin (e.g., of concrete) and higher repair costs in not damaging the smoother floor of the basin during repair.

Lastly, if a generally-triangular cross-section blade is to be used, there is additional cost to manufacture the convex and concave shapes of the scrapers 40.

Accordingly, there is a need for a sludge system and methods that reduce the tendency of the sludge to be moved in the return direction 36 (such tendency being caused by all of the scrapers moving together in the same return direction during a given time period). Further, there is a need for such system and methods to avoid the need, in actual commercial practice, for the use of any structural drive member other than the one net (or a main frame) that supports (or carries) the blades themselves. Thus, there is a need in actual commercial embodiments to eliminate the above-described extra structural drive member that has high resistance to both tension and compressive forces exerted parallel to the directions 34 and 36. Also, there is a need in actual commercial embodiments for the individual scrapers, or blades, to have a configuration manufacturable in a low-cost manner.

SUMMARY

Briefly, embodiments of the present invention meet all of the above needs by providing a way of providing a sludge collector system and methods that reduce the tendency of the sludge to be moved in the return direction. Further, embodiments of the present invention meet all of the above needs by providing a way for such system and methods to avoid the need, in actual commercial practice, for the use of any structural drive member other than the one net (or a main frame) that supports (or carries) the blades themselves. Further, embodiments of the present invention meet all of the above needs by providing a way in actual commercial embodiments to eliminate the above-described extra structural drive member that has high resistance to both tension and compressive forces exerted parallel to the directions 34 and 36. Embodiments of the present invention further meet all of the above needs by providing a way for the individual scrapers, or blades, to have a configuration that is manufacturable in a low-cost manner.

Embodiments of the present invention may meet all of the above needs by providing two blades configured to be adjacent to each other; with a drive configured to simultaneously move each of the adjacent blades relative to an outlet of a basin, wherein the drive configuration is to provide the simultaneous movement of each blade in opposition to the other blade. The embodiments may configure the drive with a first support for one blade and a second support for the other blade, the supports being separate from each other. The embodiments may further configure the drive with at least one direction-reversal unit connected between the first and second supports.

Embodiments of the present invention may meet all of the above needs by also providing a basin configured with adjacent first and second walls intersecting the floor and intersecting each other to define a corner of the basin, where a first location of blade movement is next to the walls, and a blade stop location is away from the walls, and a second location is further away from the walls than the blade stop location. One blade is further configured with characteristics of flexibility and an extended shape so that when the one blade is in the first location the one blade is flexed and extends into the corner next to both of the walls. The drive may be further configured to move the one blade from the blade stop location to the first location and cause the one blade to flex and extend into the corner so that the one blade is next to both walls and causes material near the walls to move from the walls and spill over the one blade and toward the blade stop location. The drive may be further configured to move the one blade from the first location to the blade stop location at the same time as the other blade is moved toward the one blade so that the material spills over the other blade and toward the second location.

Embodiments of the present invention may meet all of the above needs by also providing a basin for moving sludge in a first direction relative to a floor of a basin, in which a first blade is configured to extend at least partly across the basin and a second blade is spaced from the first blade and configured to extend in spaced opposition to the first blade. A drive may be configured to simultaneously move each of the spaced first and second blades along a common plane relative to the floor of the basin in opposition to each other, the simultaneous movement comprising the drive moving the first blade in the first direction and the drive simultaneously moving the second blade in a second direction opposite to the first direction.

Embodiments of the present invention may meet all of the above needs by also providing apparatus for moving sludge across a floor of a basin from a basin wall toward a sludge outlet. A plurality of blades may comprise series of blades from a first blade to an nth blade, each blade being configured to extend at least partly across the basin in a parallel arrangement, the first blade being near the wall and the nth blade being toward the outlet. A first tensile member may carry a first group of alternate ones of the blades in a plane adjacent to the floor so that odd number blades are carried by the first tensile member. A second tensile member may carry a second group of alternate ones of the blades in the plane adjacent to the floor so that even number blades are carried by the second tensile member. A drive may be configured to only pull on the first and second tensile members in a first direction so that the respective first and second groups of alternate blades are moved along the plane across the floor in the first direction, the pull on the first tensile member in the first direction alternating with the pull on the second tensile member in the first direction. A pulley may be provided, and a tensile cable extends around the pulley and is attached to each of the first and second tensile members. The first tensile member pulled in the first direction is effective to pull in the first direction on the tensile cable so that the pulled tensile cable acts around the pulley and pulls the second tensile member and the respective group of blades in the second direction in opposition to the first group of blades, blades of the first and second groups moving in opposition being effective to transfer sludge toward the outlet. The second tensile member pulled in the first direction is effective to pull in the first direction on the tensile cable so that the pulled tensile cable acts around the pulley and pulls the first tensile member and the respective group of blades in the second direction in opposition to the second group of blades, blades of the first and second groups moving in opposition being effective to transfer sludge toward the outlet. Each of the blades may be configured with a cross section comprising a pusher surface and a receiver surface facing away from the pusher surface in the second direction. The movement of each of the first and second groups of blades along the plane and in the opposite directions causes transfer of the sludge by the blades of the first group pushing the sludge in the first direction along the receiver surfaces of the blades of the second group that are moving in the second direction. Pushing of the sludge spills the sludge in the first direction past the respective blades of the second group to provide spillover sludge adjacent to the pusher surfaces of the blades of the second group.

Embodiments of the present invention may meet all of the above needs by also providing apparatus for moving sludge relative to a floor of a basin, in which a plurality of blades is configured to extend at least partly across the basin in an adjacent arrangement. A first tensile member may move at least a first one of the blades adjacent to the floor. A second tensile member may move at least a second one of the blades adjacent to the floor. The at least one first blade and the at least one second blade may comprise a first blade adjacent to a second blade. A drive may be configured to move the first and second tensile members and the respective first and second blades along the plane relative to the floor, movement including the first blade moving in a first direction relative to the floor and in opposition to the second blade and including the second blade moving in a second direction opposite to the first direction and in opposition to the first blade. A direction-reversal mechanism may be between the first and second tensile members, the direction-reversal mechanism being actuated by the first tensile member moving in the first direction to move the second tensile member in the second direction, the direction-reversal mechanism being actuated by the second tensile member moving in the first direction to move the first tensile member in the second direction.

The way embodiments of the present invention avoid the need, in actual commercial practice, for the use of any structural drive member other than the separate rails that carry the respective blades themselves, is by applying only tension, or pull, forces to each of separate rails, and by connecting one rail drive to each of the separate rails so that a pull force applied to one rail in one (e.g., forward, or "to") direction is applied by that rail (via the one rail drive) to the other rail in the opposite (e.g., return, or "fro") direction. In this manner, each rail may be fabricated from material having minimum, or reduced, structural characteristics. Such material need have a characteristic of high resistance only to tension forces, and need have low (or no) resistance to compressive forces. This characteristic greatly reduces the cost of the sludge collection system, yet each rail is structurally sufficient to carry and drive the blades through the sludge as the respective rail moves across the bottom of the basin. As a result of the new combination of the low-cost blades with the significantly improved configuration of the drive, during the respective "to" and "fro" movements the blades resist those tension forces and the drive does not apply compressive forces to the rails. Thus, the present invention eliminates the above-described prior extra structural drive member that has high resistance to both tension and compressive forces.

The way of providing scrapers, or blades, that have a low-cost configuration is by providing many low-cost blade embodiments, such as one using all-curved blades of standard configuration (such as a circular cross-section), or one using the blades shown in FIGS. 1A and 1B, and in each case of low-cost blades using the low-cost blades in a new combination with a significantly improved configuration of the drive for those low-cost blades.

Other aspects and advantages of the present invention will become apparent from the following detailed descriptions, taken in conjunction with the accompanying drawings, illustrating by way of example, the principles of embodiments of the present invention.

BRIEF DESCRIPTION OF THE DRAWINGS

Embodiments of the present invention will be readily understood by the following detailed description in conjunction with the accompanying drawings, wherein like reference numerals designate like structural elements or operations.

FIG. 2C illustrates two blades and blade motion details of an embodiment of the present invention to move sludge from a corner of the basin;

FIGS. 3A and 3B illustrate blades and blade motion details of the FIG. 2B embodiment;

FIGS. 8A through 8C illustrate method operations for changing the size of spaces between adjacent blades of an embodiment of the present invention;

FIGS. 9A, 9B, 9C, 10, 11, 12, and 13 (with FIGS. 13A and 13B) illustrate embodiments of methods of the present invention.

Other aspects and advantages of embodiments of the present invention will become apparent from the following detailed descriptions, taken in conjunction with the accompanying drawings, illustrating by way of example, the principles of embodiments of the present invention.

DETAILED DESCRIPTION

Figure 2A:
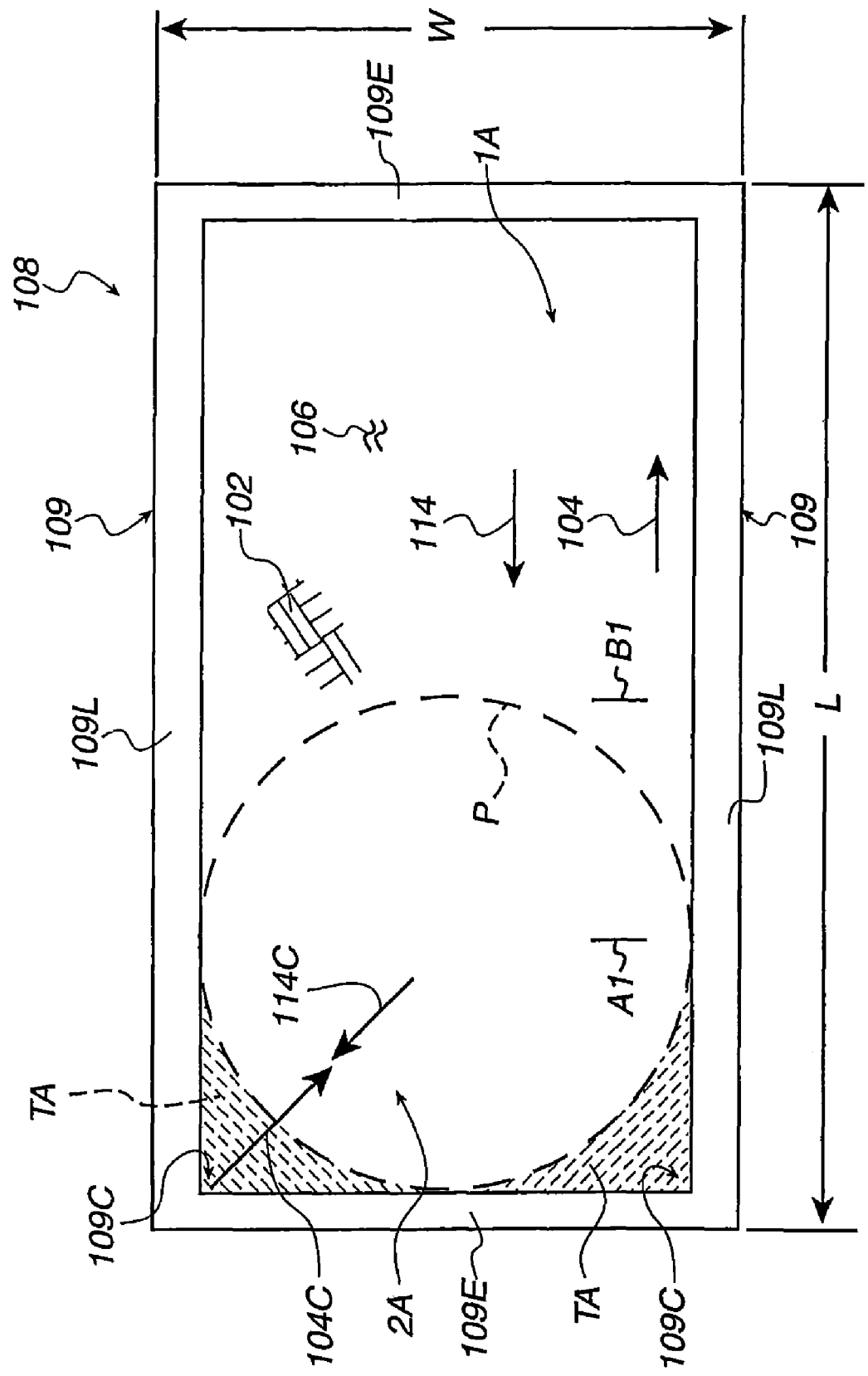
FIG. 2A is a plan view of a basin in which embodiments of the present invention may move material (e.g., sludge) by reducing a tendency in the prior systems for material to move in an undesired direction.
Figure 2B:
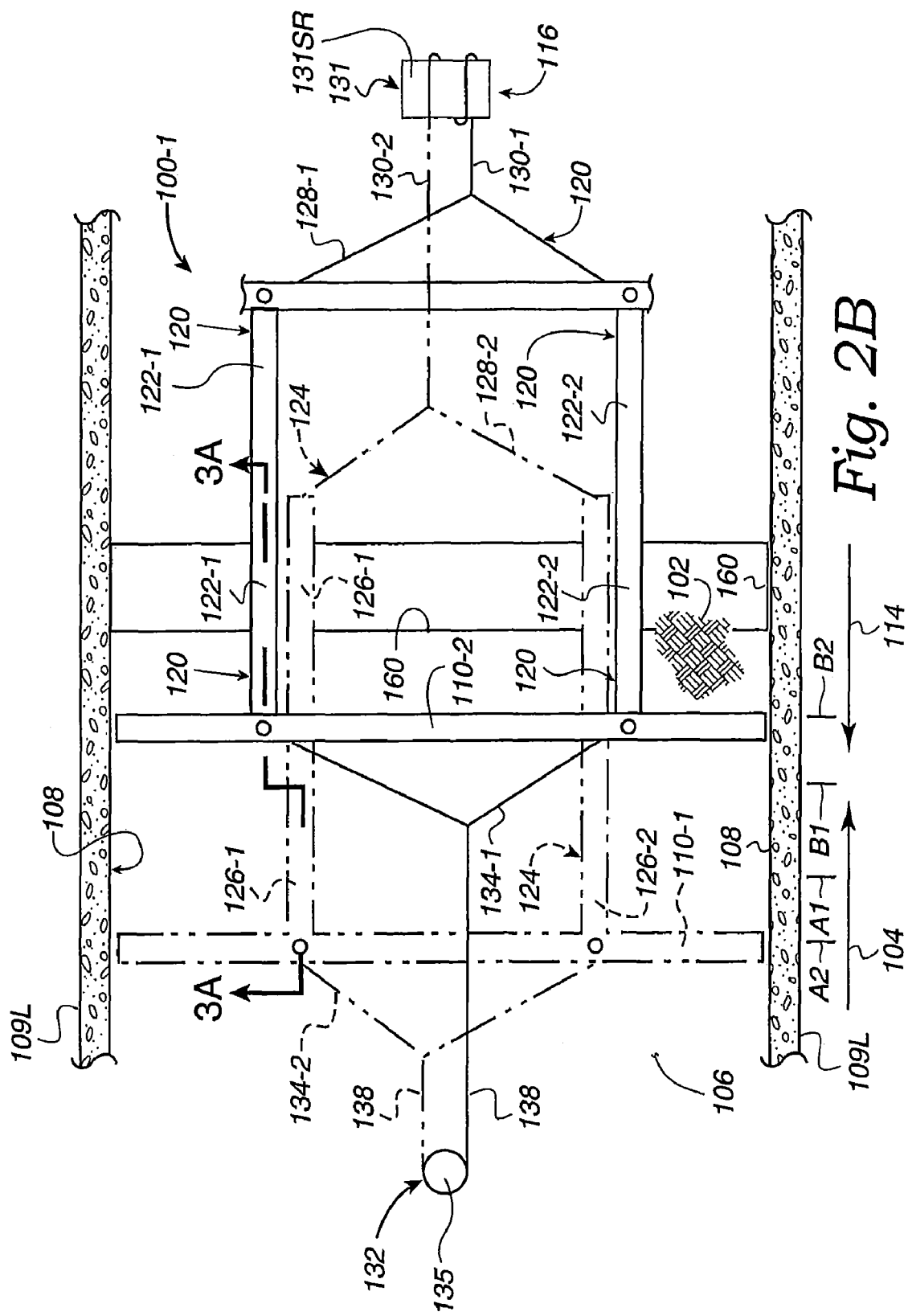
FIG. 2B illustrates two blades and blade motion details of an embodiment of the present invention to move sludge across the basin to an outlet.

Referring now to FIGS. 2A and 2B, embodiments 100 of the present invention may move material 102 in a first (or "to") direction (see arrow 104) relative to a bottom (or floor)

106 of a basin 108. The first direction is a desired direction of material movement. The basin 108 may be a container or tank provided with walls, e.g., four walls 109. The walls 109 may include two walls, a side wall 109L and an end wall 109E, that are adjacent to each other and that define a corner 109C (FIG. 2A) of the basin 108. The corner 109C is where the two walls 109L and 109E intersect, and may extend vertically, for example.

The basin 108 may contain apparatus (not shown) in which the materials 102 are collected. For example, the materials 102 may be collected by being separated from liquids (not shown) by plate or tube settlers (not shown) that promote settling of the material 102 to the bottom 106 of the basin 108. The apparatus may also be a flocculator (not shown) in which the materials 102 often inadvertently move to the bottom 106 of the basin 108. In each of the settler and flocculator examples, and in other equivalent apparatus, the materials 102 on the bottom 106 may be referred to as sludge, as defined above. By the operation of such settler and flocculator apparatus, the sludge 102 settles on, and generally covers, the entire bottom 106 between the walls 109, and may build up to a depth above the bottom 106 of about twelve inches during proper operation of the embodiments 100.

FIG. 2A shows areas on the bottom 106 along which embodiments 100 of the present invention may move the sludge 102. To enable clear illustration, the sludge 102 is shown in FIG. 2A covering only a small portion of the bottom 106, and the liquid is not shown. Also, to illustrate an area 1A along which an embodiment 100-1 (FIG. 2B) may move the sludge 102 in the first direction 104, FIG. 2A shows a width W as extending between opposite side walls 109L of the basin and a length L as extending between the two other opposite end walls 109E of the basin. The area 1A is defined by L times W. The sludge 102 may be moved across all or part of this area 1A by various embodiments of the present invention, e.g. embodiments 100-1, 100-3, and 100-4.

For descriptive purposes, FIG. 2A also shows lines identified by a letter and a number, e.g., "A1" and "B1", and FIG. 2B shows lines "A1", "B1", "C1", and "D1". Each of these lines indicates one of various locations (or positions) at which structure of the embodiments of the present invention may be positioned during the operation of the respective embodiment, such that the exemplary "A1" for example is referred to as a "position".

Also, as to the corner 109C of the basin, it may be understood that in some basins, even though there are 90 degree angles between such adjacent walls 109E and 109L, a sludge moving system (not shown) may operate to move the sludge 102 only from a circular area 2A within a circular perimeter P (shown in dashed lines) on the floor 106 of the basin 108. The movement of the sludge 102 from the circular area 2A leaves sludge in generally triangular areas TA (see dash-dash lines) that are defined by the adjacent walls 109E and 109L and by a portion of the perimeter P. As shown in FIG. 2C, an embodiment 100-2 of the present invention may be used to move sludge 102 from the triangular area TA, as described below.

In a general sense, various FIGs. show the embodiments 100, each configured with individual scraper elements, such as blades 110, and each with at least two blades. As an overview, for example, in FIGS. 2B, and 3A-3B, two of the blades (110-1 and 110-2) are described with respect to embodiment 100-1. In FIGS. 2C and 4A-4D, two of the blades (110-1 and 110-2) are described with respect to embodiment 100-2. In FIGS. 5A-5C exemplary numbers of such blades 110 are shown for an embodiment 101-3, one referred to as a first blade 110-1, another referred to as a second blade 110-2, another referred to as a third blade 110-3, and another referred to as a fourth blade 110-4. In embodiments 100-1 and 100-3, each such blade 110 is configured to move the sludge in the direction 104, and each such blade 110 is shown configured to extend across the basin 108 between opposite walls 112 to move sludge 102 generally across the area 1A of the basin 108. In an embodiment 100-2, each such blade 110 is configured to move the sludge in a direction 104C (FIG. 2A), which is away from the corner 109C and away from the walls 109L and 109E to the perimeter P. A return direction of blade movement is identified as direction 114C. In an embodiment 100-4 (FIG. 6), such blades 110 are grouped, with one group configured to move sludge in the direction 104 (referred to as 104R), and another group configured to move sludge 102 in an intended direction 104L opposite to the one direction, so that the sludge may be moved, for example, to a central location of a sludge outlet between the groups of blades, as described below.

In each embodiment 100, as described below, one blade 110 moves in opposition to an adjacent blade 100, such that while one blade moves in the desired direction 104 the other blade moves oppositely in the return direction 114. With this in mind, also in a general sense, each blade 110 may include structure to limit sludge movement in the return direction 114. Such structure is initially described with respect to two blades, blades 110-1 and 110-2 shown in FIGS. 2B, 3A and 3B. Referring to FIG. 3A, in a general sense, the blades 110 are configured with a receiver surface (RS) and a pusher surface (PS). The blades 110 may be of any configuration that fosters (or promotes or allows) "spillover" from RS to PS during the movement of the blades 110 in opposition to each other. FIGS. 3A and 3B show a right triangular configuration, which is referred to as an all straight-side blade configuration, with a cross-section defining a right triangle. Spillover is movement or transfer of sludge 102 from a first side of the blade 110 (adjacent to the RS) to a second side of the blade, the second side being opposite to the first side and being the PS. Thus, the RS is at the first side and the PS is at the second side. This sludge transfer (spillover) occurs during movement of two blades in opposition to each other.

Figure 4A:
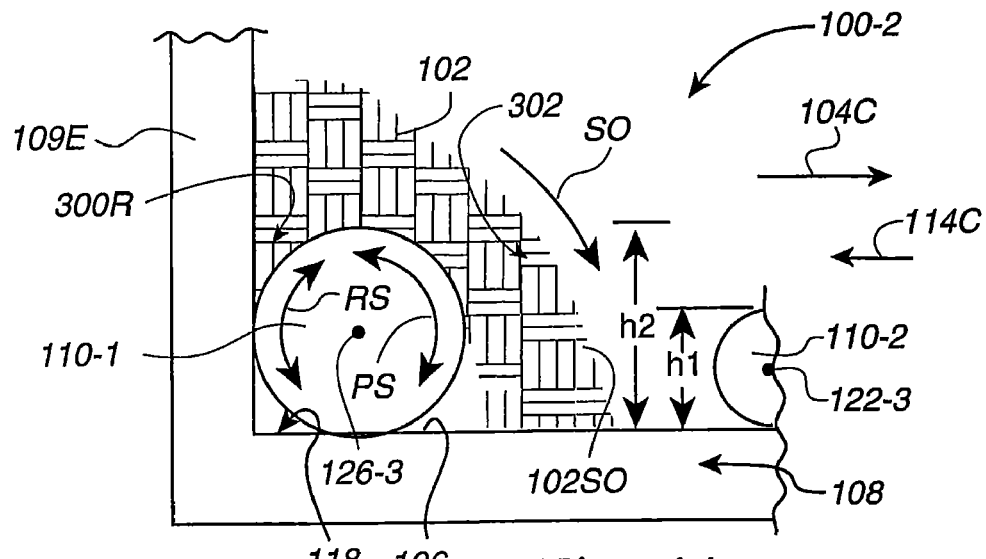
FIGS. 4A, 4B, 4C, and 4D illustrate sludge movement structure of the FIG. 2C embodiment of the present invention.
Figure 5A:
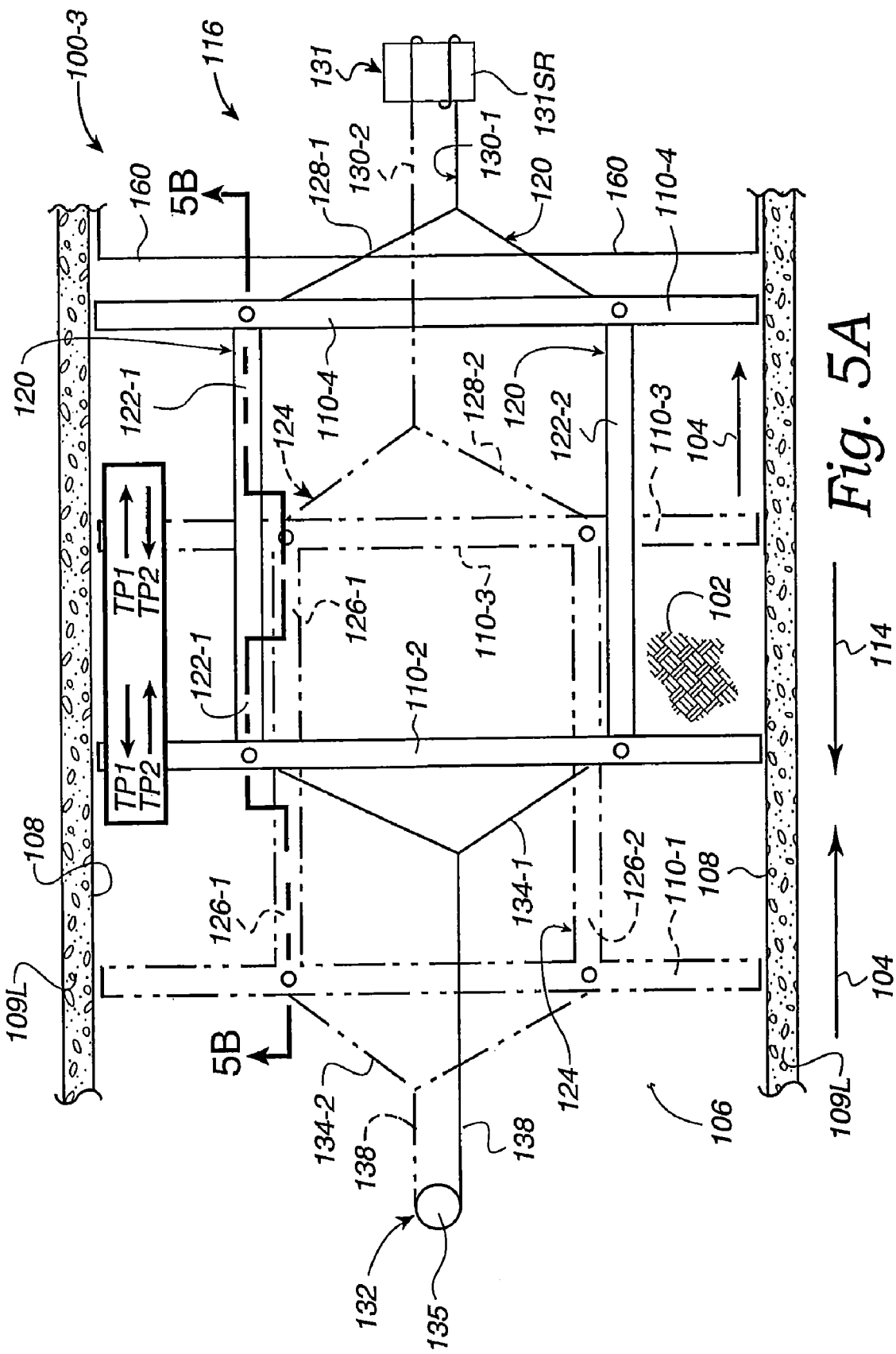
FIGS. 5A, 5B, and 5C illustrate sludge movement structure of another embodiment of the present invention in which two sets of blades cooperate to move sludge toward one sludge outlet.
Figure 5B:
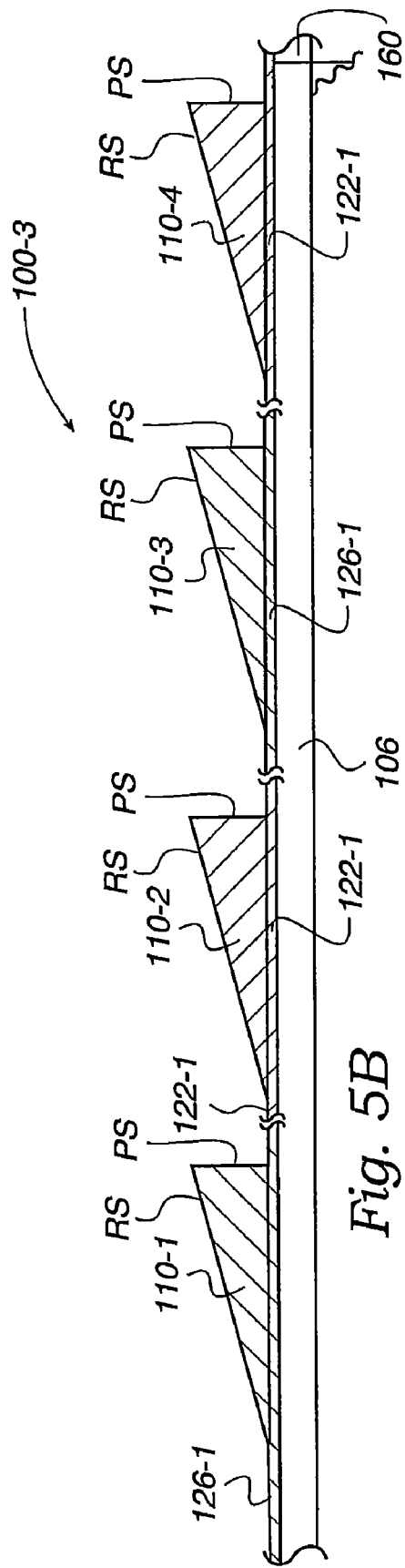
Figure 5C:
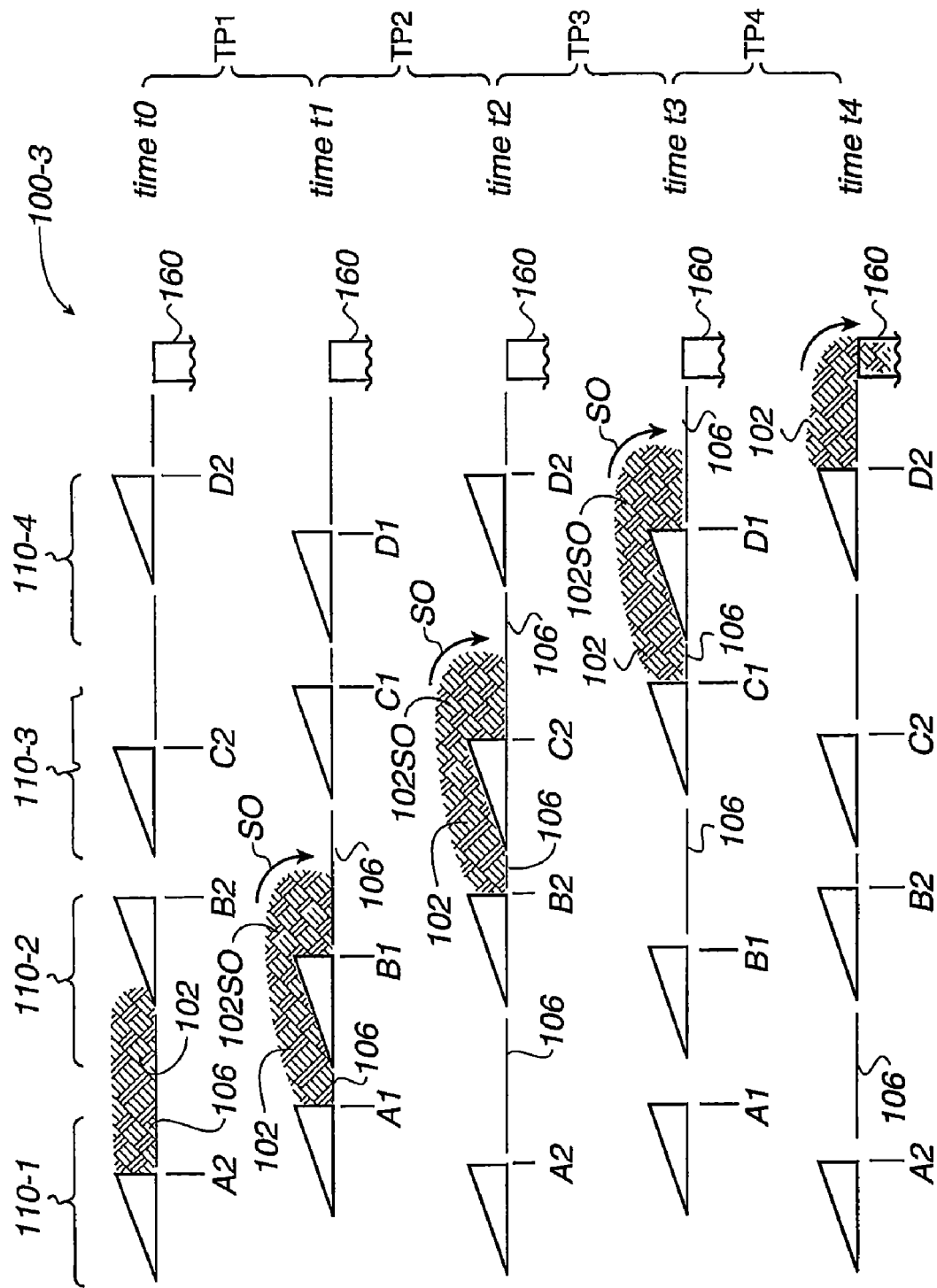

In another exemplary blade configuration, FIG. 4A shows embodiment 100-2, including all-curve blades 110 that may be configured with an oval cross section or a circular cross sectional configuration in which a vertical plane divides the cross-section into the first side (see RS) and the second side (see PS). Each side has a substantially curved surface in that both RS and PS are curved. The exemplary circular cross sectional configuration includes two arcs (see exemplary arcs RS and PS that identify part of a circle), as shown in FIG. 4A. Thus, for each blade having the circular cross-section or the oval cross-section, the first and second sides, and related surfaces RS and PS, are adjacent to each other in that there is no straight surface between the surfaces RS and PS. Embodiment 100-2 includes a height "h" of the blades 110 above the floor 106 of the basin that may be different (see h1 and h2), described below in connection with two blades 110-1 and 110-2 being in an "adjacent" arrangement.

Figure 1A:
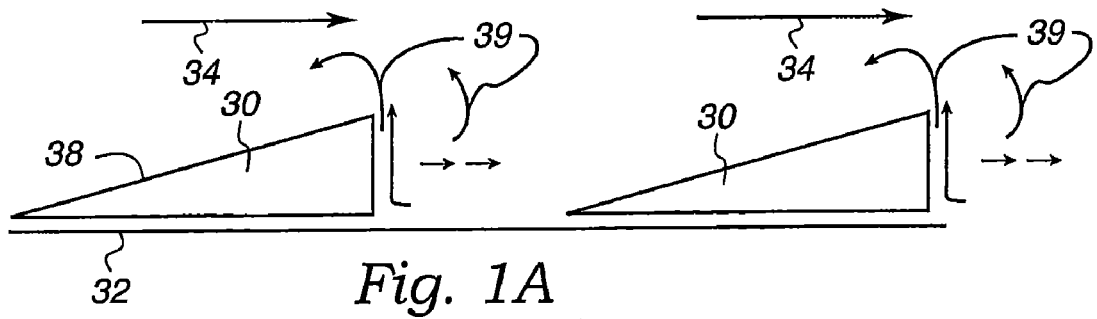
FIGS. 1A through 1D describe two embodiments of prior art systems for moving material in a basin.
Figure 1B:
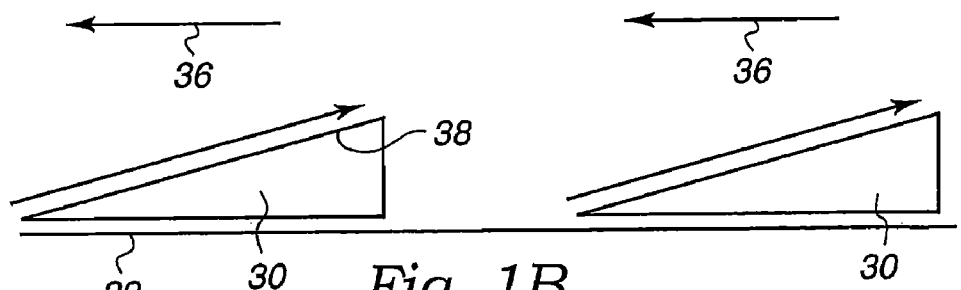
Figure 1C:
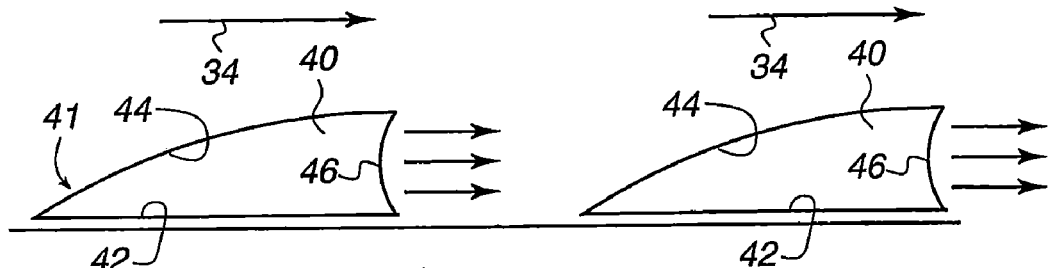
Figure 1D:
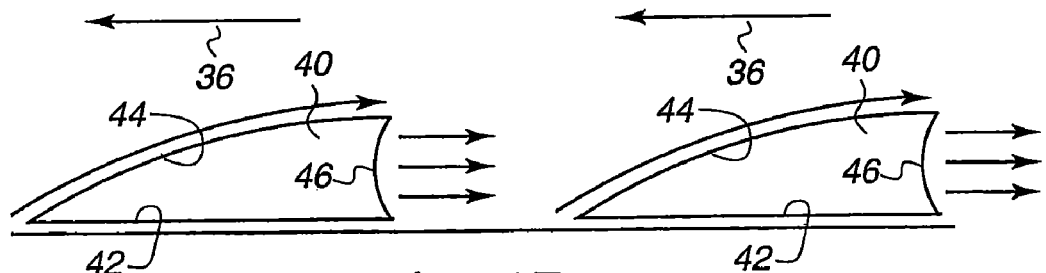

In other exemplary blade configurations, FIGs. 1C and 1D show a compound blade configured with a cross-section defining the first side 44 as a first arc and the second side 46 as a second arc, where the arcs do not define the oval or circular cross-section, and where one arc is concave and one arc is convex. In FIGS. 1C and 1D, the PS side 46 is concave and the RS side 44 is convex.

It is to be understood that the embodiments 100 of the present invention may be used with any configuration of the blade 110 that fosters (or promotes or allows) such "spillover" from RS to PS during the movement of the blades 110 in opposition to each other. The movement of the blades 110 in opposition to each other relates to an "arrangement" of two "adjacent" blades 110. All of the embodiments 100 have at least two of the above-defined blades 110, and may have any number of such blades 110 as may be necessary for the size of the basin 108 or for the rate at which the sludge 102 is to be moved, for example. When two blades 110 are "arranged" to be "adjacent", FIG. 2B shows that a first blade 110-1, for example, is on the left and a second blade 110-2, for example, is on the right. The respective first and second blades 110-1 and 110-2 are next to each other, which is spaced by a distance that is varied during sludge transfer, the distance being in a range of from zero to four inches, and this is referred to as being "adjacent to" each other, or being "adjacent blades"; thus there normally is no other "thing" (sludge pusher structure) between the two adjacent blades (there is only a space containing sludge between the two adjacent blades 110-1 and 110-2).

In another general sense, as an example for movement of sludge 102 from left to right as viewed in FIG. 3A, the RS of each blade 110-1 and 110-2 faces left (to receive sludge to be pushed to the right) and the PS of each blade 110-1 and 110-2 faces right (to push the sludge to the right); thus the PS of the first (left) blade 110-1 is next to the RS of the second (right) blade 110-2. It may also be understood that for this exemplary sludge movement to the right, the (left) first blade 110-1 may be referred to as a "rear" blade because, in the direction of sludge movement 104, the rear blade 110-1 is "behind" the second blade 110-2, and the second blade 110-2 may thus be referred to as the "front" blade. In this example, the direction of desired sludge movement is 104.

Figure 6:
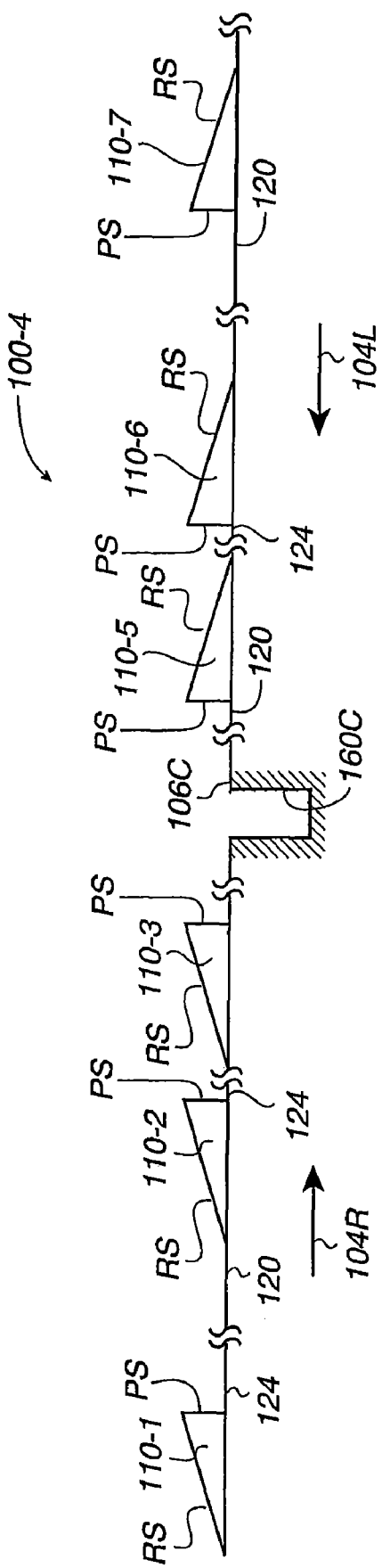
FIG. 6 illustrates sludge movement structure of another embodiment of the present invention in which two sets of blades cooperate to move sludge in opposite directions toward one central sludge outlet.

In another general sense, as an example for movement of sludge 102 from right to left as viewed in FIG. 6, a first blade 110-7 is on the right and a second blade 110-6 is on the left. As an example for movement of sludge from right to left, the RS of each blade faces right (see RS of blade 110-6, to receive sludge to be pushed to the left) and the PS of each blade faces left (see PS of blade 110-6, to push the sludge to the left onto RS of blade 110-5); thus the PS of the first (right) blade 110-7 is shown next to the RS of the next (left) blade 110-6 in this example. It may also be understood that for this sludge movement to the left, the blade 110-6 may also be referred to as a "rear" blade because in the direction of sludge movement it is behind blade 110-5, and blade 110-5 may be referred to as the "front" blade. In this example of FIG. 6, with two desired directions, the directions of desired sludge movement are shown as 104R to the right and 104L to the left for sludge movement to the middle of the basin 108 at which a sludge outlet 160C may be located.

With this front and rear blade description in mind, in the all-curved blade embodiment of FIGS. 2C and 4A-4D, the rear blade 110-1 is generally configured with the height h2 above the basin floor, height h2 having a value that exceeds a height h1 of the front blade 110-2 to assure transfer of sludge 102 via spillover from the front of the rear blade 110-1 to the front of the front blade 110-2. Thus, the spillover may be further defined as movement or transfer of sludge from a first side of the front blade (adjacent to the RS of the front blade) to a second side of the front blade (adjacent to the PS of the front blade), in which the second side is at the front of the front blade 110-2. In FIG. 4A, RS and PS are indicated by arcuate arrows that identify the extent of the respective receiving surface and pusher surface.

It may also be understood from the description below of FIG. 5B, for example, that in embodiment 100-3 (when three or more exemplary blades 110-1, 110-2 and 110-3 are arranged to be adjacent), a first blade 110-1 is on the left and a second blade 110-2 is on the right of the first blade 110-1 and a third blade 110-3 is on the right of the second blade 110-2, as another example for movement of sludge from left to right in direction 104. For desired sludge movement from right to left in the direction 104L (FIG. 6), first blade 110-7 is on the right, second blade 110-6 is on the left of the blade 110-7, and third blade 110-5 is on the left of the second blade 110-6, and the pusher surface PS of each such blade 110-5 through 110-7 faces left.

One aspect of the first embodiment 100-1 is shown in detail in FIGS. 2B, 3A and 3B. The two blades 110-1 and 110-2 are shown in FIGS. 3A and 3B configured with the right triangle cross section. To provide the embodiment 100-1 with a characteristic of reducing a tendency of the sludge 102 to be moved in the return direction 114 described above with respect to prior sludge collectors, a drive 116 (FIG. 2B) is configured to move each of the spaced blades 110-1 and 110-2 simultaneously and in two aspects of opposition to each other, including movement of the two blades 110-1 and 110-2 toward each other, and movement of the two blades 110-1 and 110-2 away from each other. This movement in opposition may be referred to as "the blade movement", and is used to described the two blades 110-1 and 110-2, and to describe the other blades, e.g., 110-3 through 110-7, for example. For ease of understanding, in FIG. 2B the portion of the drive 116 that moves the blade 110-2 is shown in solid lines, and the portion of the drive 116 that moves the blade 110-1 is shown in dot-dot-dash lines. The blades 110-1 and 110-2 move along a common plane 118 (FIG. 3A) relative to the floor 106 of the basin 108. To provide such blade movement, the drive 116 may be configured with a first support assembly (or rail assembly or slide assembly) 120, shown in solid lines. The first support assembly 120 is also referred to below as a first tensile member in view of structural characteristics by which the first support assembly 120 is only pulled to move the blade 110-2 alternately in the first direction 104 and then in the second direction 114 and then back in the first direction, etc. The first support assembly 120 may include two spaced first rails, or first tensile rails, 122-1 and 122-2. The rails 122-1 and 122-2 are shown in FIG. 2B in solid lines, and extend parallel to each other, and the rails are spaced from, and generally parallel to, opposite walls 109L (FIG. 2A). The rails 122-1 and 122-2 are connected to and support the blade 110-2. The connection is illustrated in FIG. 2B, for example, by small circles overlying the connected blades 110-1 and 110-2 and the rails 122-1 and 122-2.

To further provide the blade movement, the drive 116 may be further configured with a second support assembly (rail or slide assembly) 124. The second support 124 is also referred to below as a second tensile member in view of structural characteristics by which the second support assembly 124 is only pulled to move the blade 110-1 alternately in the second direction 114 and then in the first direction 104 and then in the second direction, all in opposition to movement of the blade 110-2. The second support assembly 124 may comprise two rails, or tensile rails, 126-1 and 126-2. The rails 126-1 and 126-2 are shown in FIG. 2B, and to easily distinguish from support 120 and rails 122-1 and 122-2, are shown in dot-dot-dash lines. The spaced second rails 126-1 and 126-2 extend parallel to each other and spaced from, and generally parallel to, the walls 109L. The spaced second rails 126-1 and 126-2 are connected to and support the blade 110-2 (see similar circles over rails 126-1 and 126-2 and blade 110-1).

The rails 122-1 and 122-2 are not connected to (and are thus separate from) the blade 110-1, and the rails 126-1 and 126-2 are not connected to the blade 110-2, such that the blades 110-1 and 110-2 do not move in the same direction (e.g., 104 or 114) during the same time period TP1, TP2, etc.

The movement of the blade 110-2 may be such that, during an exemplary period of time TP1 during which the drive 116 moves the blade 110-1 in the first direction 104 (for example), the drive 116 moves the blade 110-2 in the second direction 114. The blade movement also occurs as follows in relation to another exemplary time period TP2 that is immediately later than the exemplary period of time TP1. During time period TP2, the drive 116 moves the blade 110-1 in the second direction 114, and the drive 116 moves the blade 110-2 in opposition to the first blade 110-1 (i.e., in the first direction 104).

Still referring to FIG. 2B, in the embodiment 100-1 of the present invention, the drive 116 is configured with a first (or right as viewed in FIG. 2B) yoke, or pull-only unit, 128-1 connected to a first pull-only drive cable 130-1 that is pulled by a pull-only drive motor system 131. The pull-only unit 128-1 is also connected to a right end of each of the first rails 122-1 and 122-2 of the first rail assembly 120. The first pull-only drive cable 130-1 only applies a tension, or tensile, force to the pull-only unit 128-1, which force is a pull in the first direction 104 and thus moves the blade 110-2 in the first direction 104.

The first rails 122-1 and 122-2, as well as the pull-only unit 128-1 and the pull-only drive cable 130-1, may each have a characteristic of only having high resistance to a tension force (e.g., to a "pull" or "pulling" force), which is to say that the first rails 122-1 and 122-2, and the pull-only unit 128-1 and the pull-only drive cable 130-1 are not capable of exerting any compressive force and are not capable of resisting any compressive force. Thus, the pull-only drive cable 130-1 cannot "push" on the first rails 122-1 or 122-2, and the first rails cannot withstand any such "push". The characteristic of the pull-only drive cable 130-1 includes having a tensile strength of about 10,000 pounds, and no ability to withstand or exert any compressive force. An exemplary rail 122-1 or 122-2 may be a thin member having a rectangular cross-section, such as a length of from about two inches to about three inches, and a width of from about one-eighth inch to about one-quarter inch. The characteristic of the thin member includes having a tensile strength in a range of from about 5,000 pounds to about 10,000 pounds. This may be referred to as a "given" tensile strength value. The characteristic of such rail 122 also includes having no ability to withstand or exert any compressive force, which is also referred to as having a compression strength of a value substantially less than that of the given tensile strength value. It may be understood, therefore, that the rails 122-1 and 122-2 and the pull-only unit 128-1 and the pull-only drive cable 130-1 having these respective characteristics may be referred to as "tensile members".

The drive 116 is also configured to pull the second rail assembly 124 in the first direction 104. For causing this aspect of the described blade movement of the blade 110-1, the pull-only drive motor system 131 is configured to pull on a second cable 130-2 that is connected to a yoke, or second pull-only unit, 128-2, which pulls on the second rails 126-1 and 126-2 in the first direction 104. Each such pull-only cable 130-2, pull-only unit 128-2, and second rail 126-1 and 126-2 has the given tensile strength value which is sufficient to enable the respective tensile member to respond to the pull of the drive 116 (e.g., of motor system 131) to cause the blade 110-1 to push the sludge 102 in the first direction. It may be understood, therefore, that each of the pull-only cable 130-2, the pull-only unit 128-2 and the rails 126-1 and 126-2 may also be referred to as a "tensile member".

As described above, blade movement in opposition to each other includes movement of the two blades 110-1 and 110-2 toward each other, in which one blade 110 moves in the return direction 114. To achieve this return movement, the drive 116 is configured with a two-part direction-reversal mechanism (or assembly) 132, one part being for the rail assembly 120 and one part being for the rail assembly 124. For the first rail assembly 120, a first (or right as viewed in FIG. 2B) direction-reversal yoke 134-1 is connected to a left end of each of the rails 122-1 and 122-2 (solid lines). The direction-reversal yoke 134-1 is also connected to one end of a direction-reversal cable 138. The cable 138 extends 180 degrees around a direction-reversal unit, configured as an idler pulley, 135 to an opposite cable end that is connected to a second direction-reversal yoke 134-2 connected to the rail 126-1 and rail 126-2.

The rails 122-1 and 122-2 support the blade 110-2 for the blade movement, that is, support the blade 110-2 for the movement simultaneously with and in opposition to the movement of the blade 110-1. During blade movement in the first direction 104, the direction-reversal assembly 132 operates so that the yoke 134-1 and direction-reversal cable 138 pull on the direction-reversal yoke 134-2 in the return direction 114. The yoke 134-2 pulls the rails 126-1 and 126-2 for causing the return movement 114 of the rails 126 and the blade 110-1. Each of the direction-reversal yoke 134-1 and direction-reversal cable 138 and direction-reversal yoke 134-2 may be referred to as a tensile member in that each has the respective given tensile strength value which is sufficient to enable the respective tensile member to respond to the drive 116 to cause the blade 110-1 to move in the return direction 114 and push through the material 102 that is on the bottom 106 of the basin 108. As described above, each such first tensile member 122-1 and 122-2 and direction-reversal yoke 134-1, direction-reversal cable 138, and direction-reversal yoke 134-2 has a compression strength of a value substantially less than that of the given tensile strength value, such that the compression strength value is insufficient to enable the respective tensile member to respond to a push, for example a push attempting to cause the blade 110-1 to push material 102.

To effect the described blade movements, the drive 116 is also configured with the drive motor system 131. The motor system 131 causes the pull-only cable 130-1 to pull in the one direction 104, e.g., during alternate time periods, e.g., TP1, TP3, et seq. The motor system 131 also causes the pull-only cable 130-2 to pull in the same one direction 104, e.g., during other alternate time periods, e.g., TP2, TP4, et seq., where the order of the time periods is TP1, TP2, TP3, etc. It may be understood that in response to each such pull in the first direction, one blade 110 is moved in the one direction while the direction-reversal assembly 132 causes the other blade 110 to move in the opposite direction 114. In detail, in response to each such pull of the pull-only drive cable 130-1 in the first direction 104, blade 110-2 is moved in the first direction 104 while the direction-reversal assembly 132 causes the other blade 110-1 to move in the return direction 114. Also, in response to each such pull in the first direction 104 by the pull-only drive cable 130-2, the blade 110-1 is moved in the first direction 104 while the direction-reversal assembly 132 causes the other blade 110-2 to move in the opposite return direction 114.

In review, the drive 116 is configured to simultaneously move each of the spaced first and second blades, e.g., 110-1 and 110-2, along the common plane 118 relative to the floor 106 of the basin 108 in opposition to each other. The simultaneous movement includes the drive 116 moving the first blade 110-1 in the first direction 104 and the drive 116 (via the direction-reversal unit 135) simultaneously moving the second blade 110-2 in the second direction 114 opposite to the first direction 104.

Embodiments of the motor system 131 are described below and noted as embodiments 131-1, 131-2, etc. The blade movement is first described with reference to FIGS. 3A and 3B (that are side views of FIG. 2B) and with respect to the exemplary time periods. Time period TP1 extends from a time t0 to a time t1, time period TP2 extends from time t1 to a time t2, time period TP3 extends from time t2 to a time t3, and time period TP4 extends from time t3 to time t4. Each time period TP has an exemplary duration that is substantially the same as every other time period TP. Such duration may be selected from a range of about sixty seconds to about one-hundred twenty seconds.

FIGS. 3A and 3B show exemplary positions of the blades 110-1 and 110-2 at exemplary respective times t1 and t2. For clarity of initial description, these FIGs. do not show the sludge 102. FIG. 3A illustrates that at t1 (the end of TP1) the blade 110-1 is at a left position A2 and the blade 110-2 is at a right position B2. FIG. 3B illustrates that at t2 (the end of TP2) blade 110-1 is at a right position A1 and blade 110-2 is at a left position B1. For this exemplary pair of blades 110 represented by blades 110-1 and 110-2, the positions A2 and B2 identify the positions of the blades 110 in which the blades are spaced apart by a maximum distance MAX. An exemplary maximum distance MAX may be twice a distance D through which a blade 110 is moved during the respective time period TP. Thus, for example, FIG. 3A may be described as showing the blade 110-2 at time t1 after that blade 110-2 was moved a distance D of two feet (from B1 to B2) in the forward direction 104. For another example, in FIG. 3A the blade 110-1 is shown at time t1 after it was moved a distance D of two feet (from A1 to A2) in the return direction 114. In these examples, at the time t1 the exemplary maximum distance MAX may be four feet. In practice, each of the blades 110 may be moved through a distance D that is in a range of about two feet to about three feet in either of the first direction 104 or the second direction during one time period TP, such that the distance MAX may be from about four feet to about six feet.

FIG. 3B shows that for the same exemplary pair of blades 110 represented by blades 110-1 and 110-2, the positions A1 and B1 identify positions of the blades 110 spaced apart by a minimum distance MIN. An exemplary minimum distance MIN may be zero inches, and may be in a range from about zero to about four inches. Thus, for example, FIG. 3B may be described as showing the blade 110-1 at time t2 after moving in the first direction 104 an exemplary distance D of two feet from position A2 to position A1. Also, FIG. 3B may be described as showing the blade 110-2 at time t2 after moving an exemplary distance D of two feet in the return direction 114 from the position B2 to position B1. In this example, at the end of the time period TP2 the exemplary minimum distance MIN is shown as having a value more than zero inches but less than about four inches.

Referring to FIGS. 2B and 3A, during the time period TP1 the motor system 131 may pull on the cable 130-1 (see solid lines) so that pull-only unit 128-1 pulls the support assembly 120 in the first direction. The blade 110-2 moves in the first direction 104 (from B1 to B2). The direction-reversal assembly 132 reverses the direction of the cable 138 to move the blade 110-1 from position A1 to A2. The motor system 131 releases (does not pull on) cable 130-2, which is free to move in the second direction 114 in response to pulling of the reverse-direction assembly 132. Thus, the rail assembly 120 moves in the sludge movement direction 104. The rail assembly 124 is pulled in the return direction 114 due to the rails 122-1 and 122-2 of the rail assembly 120 pulling on the direction-reversal yoke 134-1 in the first direction 104, and due to the idler pulley 135 reversing the cable 138 to act on the direction-reversal yoke 134-2. The rail assembly 124 (and blade 110-1) are thus pulled in the return direction 114 from position A1 to A2. Thus, the blades 110-1 and 110-2 move away from each other to the MAX spaced positions shown in FIG. 3A.

The next time period TP2 starts immediately after time period TP1. During the next time period TP2, the blades 110-1 and 110-2 are moved toward each other to the respective positions A1 and B1 shown in FIG. 3B. For these moves, the motor system 131 may pull on the cable 130-2 (dot-dot-dash lines) and move the pull-only unit 128-2 in the first direction 104 and may release the cable 130-1 for movement in the second direction 114. During the time period TP2, the pull on the cable 130-2 pulls the pull-only unit 128-2, which pulls the rails 126-1 and 126-2, which move the blade 110-1, all in the first direction 104. During the time period TP2, the rails 126-1 and 126-2 pull on the reverse-direction yoke 134-2 in the first direction 104 and pull the drive member 138 counterclockwise around the idler pulley 135 to cause a pull on the reverse-direction yoke 134-1 in the second direction 114. The pull on the yoke 134-1 pulls on the rails 122-1 and 122-2, and the rails 122-1 and 122-2 move the blade 110-2, all in the second direction 114. Thus, the blades 110-1 and 110-2 move toward each other during TP2 to the FIG. 3B locations. In this manner, during each of the exemplary time periods TP1 and TP2 the blades 110-1 and 110-2 move in opposition to each other. The action of the exemplary oppositely moving blades 110-1 and 110-2 on the sludge 102 is described below.

FIGS. 3A and 3B also illustrate an exemplary cross-sectional configuration of the blades 110-1 and 110-2, showing each of the first and second blades having the exemplary low-cost, right triangular cross section. Such cross section may include the pusher surface, or face, PS. The pusher face PS may extend perpendicularly relative to the rails 122 or 126, and may have a height above the rails (e.g., above rails 122 or 126) of from about one inch to about three inches, and in a preferred embodiment may have a height of 1.5 inches. The cross section may include the receiver (or inclined or hypotenuse) surface RS tilted away from the pusher face PS in the second direction 114. The surface RS is thus inclined relative to the plane 118. A base, or long side, 154 is secured to a respective one of the rails 122 and 126. The base 154 may have a length parallel to the respective first and second directions 104 and 114 of from about two inches to about eight inches, and in a preferred embodiment may have a length of four inches. An orientation of the blades 110 may be defined in terms of a sludge push direction toward which the respective pusher faces PS are directed. One sludge push direction in the above description of FIG. 3A is the exemplary first (or "to") direction 104. As noted in re FIG. 6, two sludge push directions may be provided. The above-described tilting of the inclined surface RS means that the surface RS is generally directed away from the sludge push direction 104. The blades 110 having this three-part configuration may be fabricated from flat stock material, which is relatively low in cost as compared to curved stock material which may be used to fabricate the curved structures 44 and 46 shown in FIGS. 1C and 1D, for example.

To illustrate the embodiment 100-2, reference is made to FIGS. 2A, 2C, 4A, 4B, and 4C. FIG. 2A shows the arrow 104C indicating the desired direction of sludge movement to move sludge from the corner 109C into the area defined by the perimeter P, and shows the return direction 114C. FIG. 4A shows the above-described all-curved cross sectional configuration of the blades 110-1 and 110-2 of embodiment 110-2. This configuration may also be flexible as described below, so that the blades 110-1 and 110-2 conform to the configuration of the tensile members 122-3 and 126-3 described below for supporting the respective blades 110-1 and 110-2.

FIG. 2C shows a plan view of the blades 110-1 and 110-2 used in embodiment 100-2. Similar to all embodiments 100, in embodiment 100-2, blade movement in opposition to each other includes movement of the two blades 110-1 and 110-2 toward each other, and movement in opposition to each other also includes movement of the two blades 110-1 and 110-2 away from each other, such that the above-described movement in opposition of the blades of embodiment 100-2 is also referred to as "the blade movement". For support of the blade 110-2, an embodiment 120-2 of the first support assembly 120 is configured with a first tensile member 122-3 having the above-described characteristic of transferring only tensile forces. For support of the blade 110-1, an embodiment 124-2 of the second support assembly 124 is also configured with a second tensile member 126-3 having a characteristic of transferring only tensile forces.

Figure 4B:
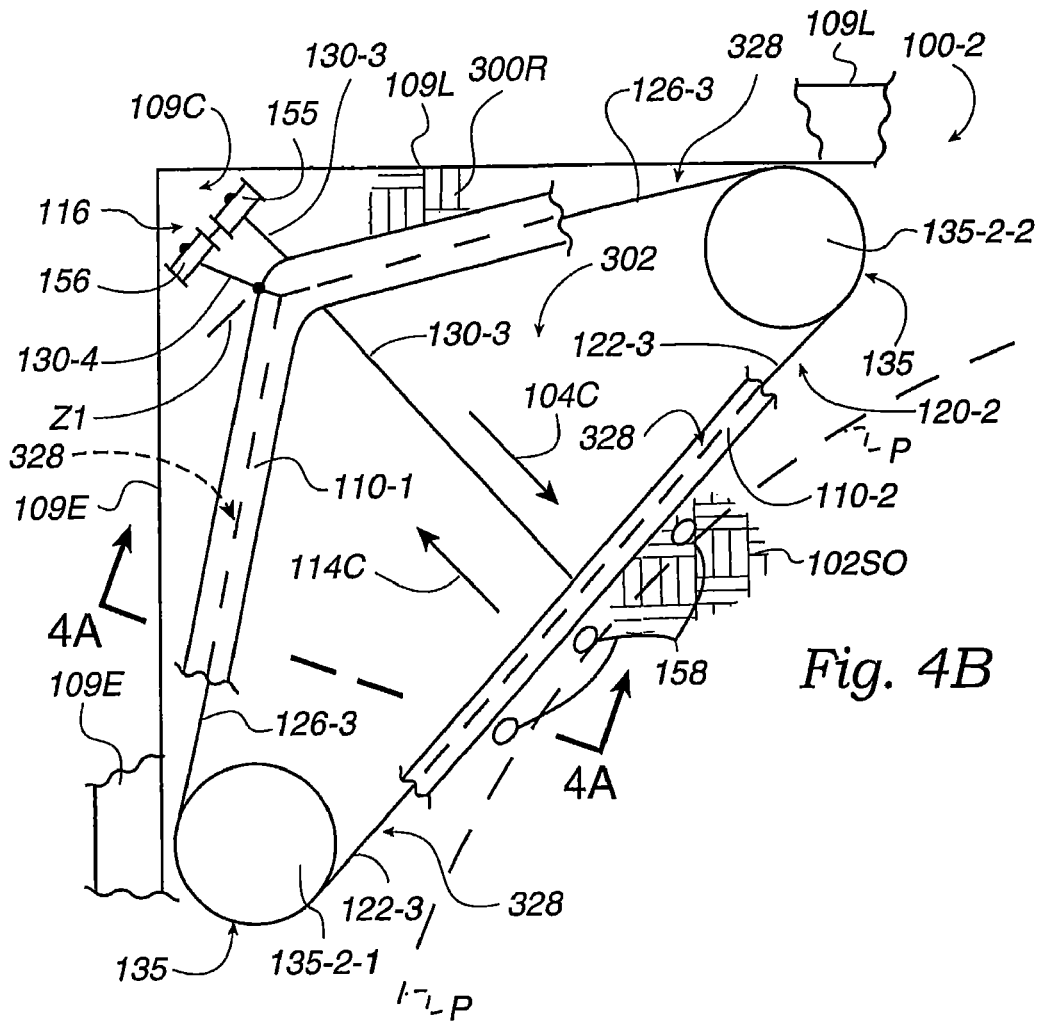

FIG. 4B shows that in the manner of the tensile rail 122 of the support assembly 120, and of the pull-only unit 128-1 attached to the pull-only drive cable 130-1 (FIG. 2B), the first tensile member 122-3 is configured with a midpoint to which an embodiment of the pull-only drive cable 130 is attached (see 130-3). FIG. 4D shows that the drive cable 130-3 extends around an idler pulley 155 to the pull-only drive motor assembly 131 that pulls on the cable 130-3 to move the tensile member 122-3 in the return direction 114C. FIG. 4B also shows that in the manner of the tensile rail 126 of the support assembly 124, and of the pull-only unit 128-2 attached to the pull-only drive cable 130-2 (FIG. 2B), the second tensile member 126-3 is configured with a midpoint to which an embodiment of the pull-only drive cable 130 is attached (see 130-4). The pull-only drive cable 130-4 extends around an idler pulley 156 to the pull-only drive motor assembly 131 that pulls on the cable 130-4 to move the tensile member 126-3 in the return direction 114C.

Figure 4C:
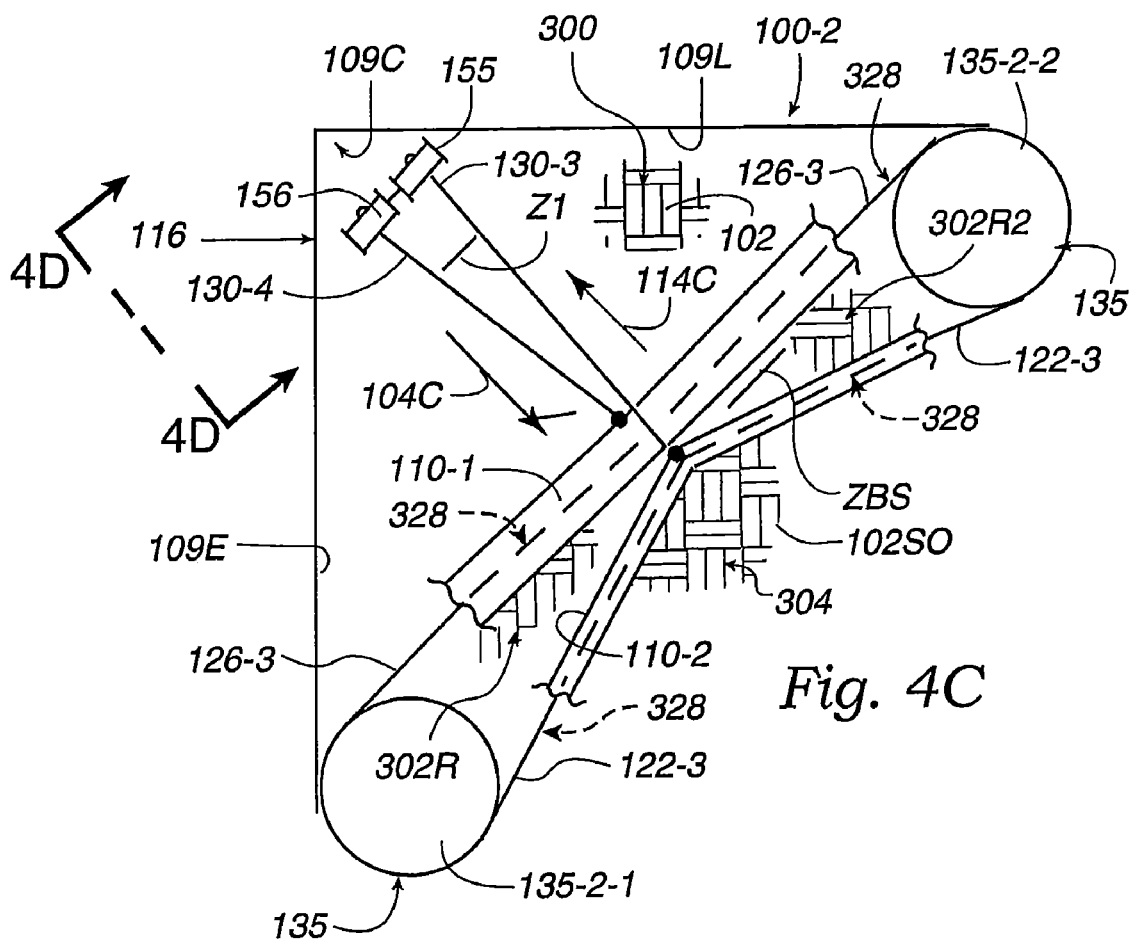
Figure 4D:
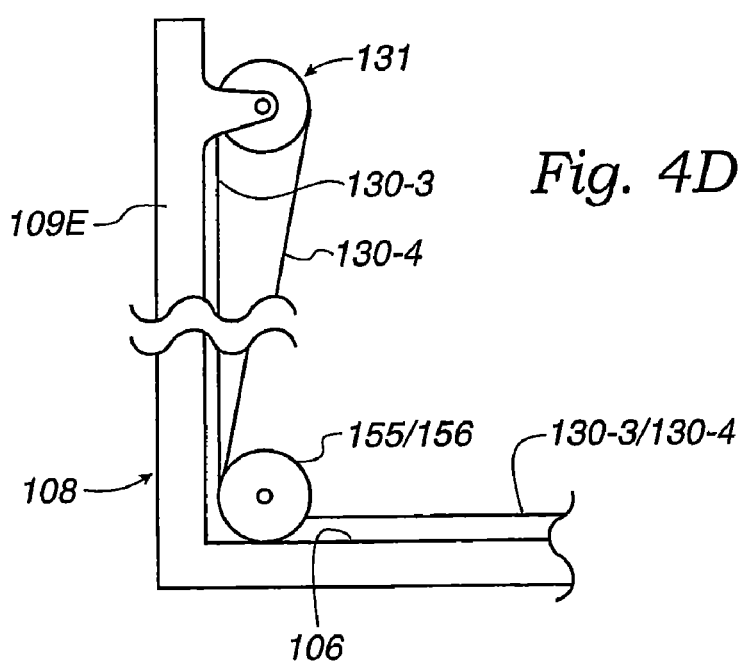

FIGS. 4B and 4C show that in the manner of the above-described direction-reversal mechanism 135, an embodiment of the direction-reversal mechanism is configured with a first pulley 135-2-1 and a second pulley 135-2-2. The first pulley 135-2-1 is configured to guide one end of the tensile member 122-3 to one end of the tensile member 126-3 and to reverse direction. Also, this embodiment of the direction-reversal unit is configured with the second pulley 135-2-2 configured to guide the other end of the tensile member 122-3 to the other end of the tensile member 126-3 and reverse direction.

In view of this description, it may be understood that the drive 116 may be described as being configured with an endless blade support cable extending around the first and second pulleys 135-2-1 and 135-2-2, in which there is defined a first section (the tensile member 122-3) extending between and on one side of the two pulleys 135-2-1 and 135-2-2, and in which there is defined a second section (the tensile member 126-3) extending between and on an opposite side of the two pulleys.

FIGS. 2C, 4B, and 4C, show that in the manner of the cable 130-2, the pull-only cable 130-3 only applies tensile forces to the tensile member 122-3, and here the force is in the direction 114C, opposite to the desired direction 104C. Similarly, the pull-only cable 130-4 only applies tensile forces to the second tensile member 126-3 in the direction 114C, opposite to the desired direction 104C.

FIG. 4A illustrates a vertical cross section of blades 110-1 and 110-2 of embodiment 100-2. Each blade 110-1 and 110-2 is configured with the all-curve configuration, illustrated as circular, as may be exemplified by a hollow tube or a solid cylinder. The respective blade supports (tensile members 122-3 and 126-3) extend through the blades 110-1 and 110-2 to move the blades as described below.

To provide the embodiment 100-2 with the characteristic of reducing a tendency of the sludge 102 to be moved in the return (or "fro") direction (arrow 114C) with respect to the corner 109C, the drive 116 (FIG. 2B) is configured to move each of the spaced blades 110-1 and 110-2 simultaneously and in opposition to each other. The blades 110-1 and 110-2 move along the common plane 118 (FIG. 4A) relative to the floor 106 of the basin 108. To provide such blade movement, the motor assembly 131 of the drive 116 only pulls on the pull-only driver cables 130-3 and 130-4 because the cables 130-3 and 130-4, as well as the tensile members 122-3 and 126-3 may each have the above-described characteristic of only having high resistance to tension forces (e.g., to a "pull" or "pulling" force).

The tensile members 122-3 and 126-3 also have a characteristic of flexibility. This means that in response to a tension force (e.g., to a "pull" or "pulling" force) from the pull-only cable 130-3 or 130-4, the respective tensile members 122-3 and 126-3 bend, or flex, as shown in FIGS. 2C, 4B and 4C. In FIG. 4B, for example, the cable 130-4 has pulled the member 126-3 into a bent configuration in which the member 126-3 is near both of the walls 109L and 109E at a position Z1. In FIG. 4C, for example, the cable 130-3 has pulled the tensile member 122-3 into a bent configuration in which the member 122-3 is at a blade stop position ZBS near the member 126-3. In each case, the respective blades 110-1 and 110-2 have also bent, or flexed, to conform to the configuration of the respective member. The pull on the member 122-3 in the return direction 114C causes the flexible member 122-3 to flex generally at the point at which the pull-only driver 130-3 is attached to the member 122-3. The resulting pull by the direction-reversing unit 135 causes the flexible member 126-3 to flex and tend to be straighter than shown in FIG. 4B, i.e., to be taut and to move in the desired direction 104C to become almost parallel to the member 122-3 at the blade stop position ZBS. In FIG. 4C, the member 126-3 is thus in a less bent (generally straight) configuration, i.e., with less bend than as shown in FIG. 4B.

With this blade movement in mind, FIG. 4B shows that the flexing of member 126-3 is a bending that stops with the blade 110-1 at the position Z1 near the walls 109E and 109L. Referring to FIG. 4A, as the blade 110-1 approaches the wall 109E, sludge 102 that has been pushed toward the wall 109E spills over the blade 110-1 and moves past the blade 110-1 in the desired direction 104C. The same action occurs at wall 109L. The members 122-3 and 126-3 being tensile members, each has the above-described respective given tensile strength value sufficient to enable the respective tensile member to respond to the drive 116 to cause the blade 110-1 to move in the return direction 114C and push through the sludge 102 that is on the bottom 106 of the basin 108 in the corner 109C, and to cause the sludge to spillover the blade 110-1, as described above.

For causing another aspect of the described blade movement of the blade 110-1, the drive 116 is further configured to move sludge 102 relative to the floor from the location Z1, which is the location next to the walls in one of the corners 109C of the basin. The drive 116 causes the sludge to move to the blade stop location ZBS (FIG. 2C) at which there is spillover of sludge over the blade 110-2, and then causes movement of the sludge to a second location Z2 (FIG. 2C) away from the corner further than position ZBS (to the perimeter P). To provide blade movement for such sludge movement, the drive 116 first only pulls on the pull-only driver cable 130-3. Under the pull-pull action of the drive 116, the pull-only driver cable 130-3 pulls in the direction 114C on the member 122-3. The pull in the return direction 114C causes the flexible member 122-3 to flex generally at the point at which the pull-only driver 130-3 is attached to the member 122-3. The flexing is a bending so that the member 122-3 and the blade 110-2 move toward the blade position ZBS. As the blade 110-2 moves toward the blade stop location ZBS, the member 122-3 and pulleys 135-2-1 and 135-2-2 of the direction-reversal unit 135 pull on the member 126-3. The member 126-3 becomes somewhat taut and moves in the desired sludge movement direction 104C from the walls 109E and 109L toward the blade 110-2 and toward the blade stop location ZBS. The blade 110-1 moving in the direction 104C pushes sludge 102 toward the blade 110-2 that is moving toward the blade 110-1. The pull of the drive 116 on the pull-only driver cable 130-3 thus causes the blades 110-1 and 110-2 to become adjacent to each other at the blade stop location ZBS, with the tensile member 126-3 taut between pulleys 135-2-1 and 135-2-2. The blades cooperate to cause the sludge that has been pushed by the blade 110-1 toward the blade 110-2 to spillover the blade 110-2 and move past the blade 110-2 in the desired direction 104C. The pull by the drive 116 stops. The drive 116 then reverses.

Under the pull-pull action of the drive 116, now the pull-only driver cable 130-4 pulls in the direction 114C on the support 126-3 for causing the previously-described movement of the blade 110-1, which is return movement 114C. The pull in the return direction 114C ends with the blade 110-1 at the location Z1 near the walls 109C. FIG. 4B shows that as the blade 110-1 moves toward the location Z1, the member 126-3 and pulleys 135-2-1 and 135-2-2 of the direction-reversal unit 135 pull on the member 122-3. The member 122-3 becomes taut and thus moves in the desired sludge movement direction 104C toward the perimeter P. The blade 110-2 pushes sludge 102 that has previously spilled over the blade 110-2, and pushes sludge that is on the floor. The blade 110-2 pushes this sludge in the desired direction 104C, and the sludge is thus moved to the location Z2, which may be within the perimeter P shown in FIG. 2A. Pins 158 may be secured to the floor 106 to prevent the blade 110-2 and tensile member 122-3 from extending into the perimeter P (FIG. 2A) to avoid interference with the sludge moving system (not shown, described with respect to FIG. 2A) that moves sludge on the area 2A of the perimeter P.

Based on this description, it may be understood that each of the members 122-3 and 126-3 is configured with a first end and a second end. The mechanism 132 is at least one direction-reversal mechanism 132 configured with at least one pulley 135-2-1, where mechanism 132 is configured with the two pulleys that are a first pulley 135-2-1 and a second separate pulley 135-2-2. Also, there is at least the one direction-reversal mechanism 132 that may also be configured with a third tensile member, that may be connected to the first end of the first member 122-3 and extend around the first pulley 135-2-1 and be connected to the first end of the second support 126-3. The at least one direction-reversal mechanism 132 may be further configured with a fourth tensile member, that may be connected to the second end of the first support 126-3 and extend around the second pulley 135-2-2 and be connected to the second end of the second support 126-3. As shown in FIG. 4B, for example, such third and fourth tensile members are the respective tensile supports 122-3 and 126-3.

Each is one piece and is connected to the other support as the respective supports extend around the pulleys 135-2-1 and 135-2-2. Also, the first pull-only driver 130-3 may be connected to the first support 122-3 and the second pull-only driver 130-4 may be connected to the second support 126-3.

Also based on this description, it may be understood that the configuration of a first blade 110-1 extends at least partly across the corner 109C of the basin. Also, a second blade 110-2 is spaced from the first blade 110-1 and is further configured to extend a least partly across the corner 109C and in spaced opposition to the first blade so that the first blade is closer to the corner 109C than the second blade 110-2. Also, a first tensile member 126-3 is for the first blade 110-1, the first tensile member being configured with a first end and a second end and connected to the first blade 110-1. Also, a second tensile member 122-3 is for the second blade 110-2, the second tensile member being configured with a third end and a fourth end and connected to the second blade 110-2. A first direction-reversal mechanism may be configured with pulley 135-2-1 as a first pulley and a length of cable may be a first tensile connector connecting the first and third ends of the tensile supports 122-3 and 126-3. A second direction-reversal mechanism may be configured with pulley 135-2-1 as a second pulley and a length of cable may be a second tensile connector connecting the second and fourth ends of the tensile members 122-3 and 126-3. The driver 116 may be said to be further configured with a first pull-only driver (cable 130-4) connected to the first tensile support 126-3; and with a second pull-only driver (cable 130-3) connected to the second tensile support 122-3. Also, the driver 116 actuates the first pull-only driver 130-4 to pull the first tensile support 126-3 toward the corner 109C to the first location Z1, and the pulled first tensile support 126-3 pulls such first and second tensile connectors around the respective first and second pulleys 135-2-1 and 135-2-2 so that the second tensile support 122-3 is pulled away from the corner and becomes taut at the second location Z2 spaced from the first location Z1. Further, the driver 116 actuates the second pull-only driver 130-3 to pull the second tensile support 122-3 from the second location Z2 toward the corner 109C to the blade stop location ZBS, and the second tensile support 122-3 is pulled by the second pull-only driver 130-3 that is effective to pull such first and second tensile connectors around the respective first and second pulleys 135-2-1 and 135-2-2, so that the first tensile support 126-3 is pulled away from the corner and toward the blade stop location ZBS. Also, driver 116 actuates the first pull-only driver 130-4 to pull the first tensile support 126-3 toward the corner to the first location Z1, with the pulled first tensile support 126-3 pulling the first and second tensile connectors around the respective first and second pulleys 135-2-1 and 135-2-2 so that the second tensile support 122-2 is pulled away from the corner 109C and becomes taut at the second location Z2 spaced from the first location Z1. The drive 116 also actuates the second pull-only driver 130-3 to pull the second tensile support 122-3 from the second location Z2 toward the corner 109C to the blade stop location ZBS, the second tensile support 122-3 pulled by the second pull-only driver 130-3 being effective to pull the first and second tensile connectors around the first and second pulleys 135-2-1 and 135-2-2 so that the first tensile support 126-3 is pulled away from the corner 109C and toward the blade stop location ZBS. Referring to FIG. 4B, it may also be understood that the second tensile support 122-3 pulled from the second location Z2 to the blade stop location ZBS and the first tensile support 126-3 pulled away from the corner 109C toward the blade stop location ZBS, are effective to transfer sludge 102SO from the first blade 110-1 over the second blade 110-2 and toward the second location Z2. Further, the second tensile support 122-3 pulled by tensile forces around the pulleys 135-2-1 and 135-2-2 is moved from the blade stop location ZBS to the second location Z2 and is effective to cause the second blade 110-2 to transfer sludge 102SO to the second location Z2.

The embodiment 100-3 is shown in FIGS. 5A through 5C, which schematically illustrate a plurality of blades 110 provided as part of the configuration of each of the first rail assembly 120 (solid lines, FIG. 5A) and of the second rail assembly 124 (dot-dot-dash lines, FIG. 5A). For example, the blades 110-2 and 110-4 are secured to the same first rails 122-1 and 122-2, such that the blades 110-2 and 110-4 form a blade array that moves in the same direction at the same time. Also, the blades 110-1 and 110-3 are secured to the same rails 126-1 and 126-2 and form a separate blade array such that the blades 110-1 and 110-3 move in the same direction at the same time. The blades 110-1 and 110-3 may be described as a set of blades, and the blades 110-2 and 110-4 described as a set of blades that is separate from the set of blades 110-1 and 110-3. Other embodiments of the present invention may have three or more blades 110 in each such set, e.g., according to how far in the first direction the sludge 102 is to be moved before reaching a sludge outlet 160 (FIG. 5C).

It may be understood from FIGS. 5A and 5B, for example, that the respective blades 110-1, 110-2, 110-3, and 110-4 are also arranged in a spaced sequence, shown as an exemplary sequence defined from left to right by the blade 110-1 followed by the blade 110-2 followed by the blade 110-3 followed by the blade 110-4.

In the configuration shown in FIG. 5A, the drive 116 is thus further configured with the first support assembly 120 connected to the blades 110-2 and 110-4, and is configured with the second support assembly 124 connected to the blades 110-1 and 110-3 (see small circles on rails 126-1).

The above description of the blade 110-1 shown in FIG. 2B applies to the two blades 110-1 and 110-3 shown in FIGS. 5A through 5C. Further, the above description of the blade 110-2 shown in FIG. 2B applies to the two blades 110-2 and 110-4 shown in FIGS. 5A through 5C. Also, the above description of the first support assembly 120, the second support assembly 124, and the tensile rails 122 and 126 applies to the same assemblies 120 and 124 and tensile rails 122 and 126 shown in FIGS. 5A though 5C. Similarly, the above description of the drive 116 configured with the pull-only units 128-1 and 128-2, with the pull-only drive cables 130-1 and 130-2, and with the pull-only drive motor system 131, applies to the same structures shown in FIGS. 5A though 5C. The support assemblies 120 and 124, the pull-only units 128-1 and 128-2, and the pull-only drive cables 130-1 and 130-2, are also referred to below as tensile members in view of structural characteristics by which these structures are only pulled and may only be pulled. FIG. 5B shows the exemplary four blades 110-1 through 110-4 one after another and mounted on the respective tensile rails 126-1, 122-1, 126-1, and 122-1. It may be understood then, that the drive 116 is configured to move the first and second tensile members (the tensile rails 122 and 126) and the respective first and second blades 110-1 and 110-2) along the plane 118 relative to the floor 106. That movement includes the first blade 110-1 moving in the first direction 104 relative to the floor 106 and in opposition to the moving second blade 110-2, and the movement includes the second blade 110-2 moving in the second (return) direction 114 opposite to the first direction 104 and in opposition to the movement of the first blade 110-1. Also, FIG. 5A shows the direction-reversal mechanism (or assembly) 132 between the first and second tensile members in that the assembly 132 is connected to the tensile members 122 and 126 (and support assemblies 120 and 124) via the direction-reversal yokes 134-1 and 134-2. In addition, it may be understood that the direction-reversal mechanism 132 is actuated by the first tensile member 122 moving in the first direction 104 to move the second tensile member 126 in the second direction 114. The direction-reversal mechanism 132 is also actuated by the second tensile member 126 moving in the first direction 104 to move the first tensile member 122 in the second direction 114. In review, the drive 116 is thus configured to simultaneously move first and second members (the support assemblies 120 and 124) so that at any time at least the blades (e.g., 110-1 and 110-2) of one first pair of alternating blades are moving toward each other and at least the blades (e.g., 110-2 and 110-3) of one different pair of alternating blades are moving away from each other.

FIG. 5C illustrates the sludge transfer action of the exemplary four blades 110-1 through 110-4 in the sludge 102 at the bottom 106 of the basin 108. The sludge transfer action results from the above-described "blade movement" that includes the simultaneous and opposing movement of the respective spaced exemplary adjacent blades 110-1 and 110-2, or of the adjacent blades 110-2 and 110-3, or of the adjacent blades 110-3 and 110-4, along the common plane 118 and in the opposite directions 104 and 114. Each of these two adjacent blades may be referred to as a "pair" of such blades 110, such that in FIGS. 5B and 5C, the following may be pairs of such blades: blades 110-1 and 110-2, blades 110-2 and 110-3, and blades 110-3 and 110-4, for example. In the diagram of FIG. 5C, columns are identified by brackets to indicate the corresponding blades 110, e.g., 110-1. Positions A1, A2, B1, B2, C1, C2, D1, or D2 of certain blades are shown. A time t0-t4 is associated with one of five rows. Thus, each row represents the corresponding position of the blades at the time corresponding to that row. For example, the time t0 in FIG. 5C corresponds to blade positions at the time t1 described with respect to FIG. 3A. In general, FIG. 5C shows that blade 110-1 moves in the forward direction 104 from position A2 to position A1, and moves in the reverse direction 114 from position A1 to A2; and corresponding blade movements are shown for the other blades 110-2-110-4. In each case of the forward blade movement in direction 104, the pull-only drive motor system 131 of the drive 116 pulls on the appropriate one of the pull-only drive cables 130-1 and 130-2, and in each case of the return blade movement in direction 114, the direction-reversal mechanism 132 of the drive 116 at the same time pulls on the appropriate one of the support assemblies 120 or 124.

FIG. 5C shows that from time t0 to time t4 the blades are effective to transfer a batch of sludge 102 from position A2 into the sludge outlet 160. In detail, during successive blade movements (e.g., during exemplary time periods TP1, TP2, TP3, and TP4, the blade movements of such pairs of blades causes transfer of the sludge 102 (sludge transfer action) only in the "to" direction 104 across the floor 106 of the basin 108. FIG. 5C shows a sequence of such sludge transfer. This sequence starts with exemplary sludge between blade 110-1 and blade 110-2 at an exemplary time t0. This sludge may, for example, have been pushed over the blade 110-1 (from left to right), which is the above-described spillover as the blade 110-1 moves to the left near the wall 109E. Blade 110-1 then pushes sludge in direction 104 to spillover blade 110-2 in TP1, then blade 110-2 pushes sludge in direction 104 to spillover blade 110-3 in TP2, then blade 110-3 pushes sludge in direction 104 to spillover blade 110-4 in TP3, then blade 110-4 pushes sludge in direction 104 into the sludge outlet 160 in TP4. In each case, the push of sludge to spillover a blade is the above-described spillover.

In more detail, FIG. 5C shows sludge transfer that occurs during an exemplary time period TP1 when the blade 110-1 of the pair (110-1 and 110-2) is moving in the first direction 104 and blade 110-2 of the pair is moving in the opposite direction 114. The blade 110-1 is initially (e.g., at time t0, in FIG. 5C) spaced by the distance MAX (FIG. 3A) from the blade 110-2 of that pair, with FIG. 5C showing sludge 102 in the MAX space. During that time period TP1 the blade 110-2 is moved in the opposite direction 114 by the direction reversal mechanism 132 (FIG. 5A) operating in TP1 (starting at time t0). As shown in FIG. 5C by the t1 row, such moving blade 110-1 has pushed an initial quantity of sludge 102 in the first direction 104 along the reverse, or oppositely, moving receiver surface RS (FIG. 5B) of the blade 110-2. That receiver surface RS was moving in the second direction 114. As indicated by arrow SO in row t1, this pushing of that initial quantity of the sludge 102 in the first direction 104 caused some of the pushed sludge 102 to spill in the first direction 104 past the oppositely moving second blade 110-2 to provide a quantity 102SO of sludge 102 to the right of blade 110-2, which is the spillover sludge. During at least a portion of the time period TP1, the spillover sludge 102SO spills and is deposited adjacent to, and to the right of, the pusher surface PS of the second blade 110-2. That spillover sludge 102SO may be said to be deposited in "front of" the pusher surface PS of the second blade 110-2, in that the first ("to") direction 104 is the desired direction of transfer of the sludge 102. Further, because of this pushing action of the pusher surface PS of the first blade 110-1 in opposition to the receiver surface RS of the blade 110-2, the initial quantity of the sludge is not moved "backward" (i.e., is not moved in the undesired second direction 114) even though the exemplary second blade 110-2 moves in the return (second, or undesired) direction 114. The configurations of the pusher surface PS of the first blade 110-1 moving in the first direction 104 and of the inclined receiver surface RS of the second blade 110-2 moving in the opposite direction 114 block (or restrict) the transfer of the sludge 102 in the undesired second direction 114, which makes the desired sludge transfer in the first direction 104 more efficient than the sludge transfer described above with respect to FIGS. 1A-1D.

FIG. 5C also shows that during TP1 the blade 110-3 moves in the direction 104 with the blade 110-1, and moves to position C1. Row t1 shows that by time t1 blade 110-3 has moved away from the blade 110-2, providing space between the blades 110-2 and 110-3 for reception of the spillover sludge 102SO. At the end of TP1, blade 110-1 is at position A1, blade 110-2 is at position B1, and blade 110-3 is at position C1.

In TP2, drive 116, via pull-only drive cable 130-1, then moves blade 110-2 from position B1 to position B2 in the first direction so that blade 110-2 moves closer to the adjacent opposing blade 110-3 that is moving in the second direction 114 under the above-described pull of the direction reversal mechanism 132 (FIG. 5A) operating in TP2 (starting at time t1). In this manner, the blade 110-2 moving in the direction 104 to position B2 (for example) limits an amount of the material 102 that the blade 110-3 moves in the second direction 114. Also, the blade 110-2 pushes a spillover amount of sludge 102SO over and to the right of the blade 110-3 in a manner similar to that shown in FIG. 5C re blade 110-1 pushing to the right.

FIG. 5C illustrates another exemplary pair of the blades 110, namely blades 110-3 and 110-4. At the end of time period TP2 described above, the blades 110-3 and 110-4 are in the same relative positions (spaced by the maximum distance MAX) as are shown in FIG. 3A with respect to blades 110-1 and 110-2. FIG. 5C (at row t3) shows that during the next time period TP3 (starting at time t2) the blade 110-3 is moved in the first direction 104 in opposition to movement of the blade 110-4 (which is moved in the second direction 114). Thus, at the end of time period TP3 blade 110-3 is shown at position C1 (its rightmost position) and blade 110-4 is shown at position D1 (its leftmost position). FIG. 5C shows that during time period TP3 the blade 110-3 deposited the spillover sludge 102SO to the right of the pusher face PS of the blade 110-4 in the first direction 104. That spillover sludge 102SO to the right of blade 100-4 includes the spillover sludge 102SO that was (during time period TP1) deposited to the right of the pusher face PS of the blade 110-2, and spillover sludge 102SO that was (during time period TP2) deposited to the right of the pusher face PS of the blade 110-3.

The next sludge transfer during the next time period TP4 may be understood by referring to FIG. 5C with respect to the blade 110-4. Upon reversal of the drive 116 and commencement of the time period TP4, the blade 110-4 is moved in the first direction 104 from position D1 to D2. The blade 110-4 (moving in the first direction 104) pushes in the first direction 104 the spillover sludge 102SO and other sludge 102 that is in front of the pusher face PS of the blade 110-4. That sludge is pushed into the sludge outlet 160 for removal from the basin.

Thus, it may be understood that as a result of a sequence of exemplary time periods TP starting from time t0, and through time periods TP1, TP2, TP3, and TP4, successive quantities 102SO of spillover sludge 102 are moved in the desired first direction 104. This movement of the sludge 102 results in the sludge 102 being directed toward the sludge outlet 160 provided in the bottom 106 of the basin 108 for removal from the basin. Referring again to FIG. 5C, it is to be understood that the sludge shown in the rows corresponding to times t0-t4 is illustrative of sequential pushing of the initial sludge 102 that was to the right of the blade 110-1 (at time t0), and that such sequential pushing continues until that sludge is in the sludge outlet 160. It is to be further understood that there is generally sludge in front of each blade 110 and that in any given TP one-half of the blades 110 are pushing sludge in the forward direction 104, and the other one-half of the blades 110 are receiving sludge on the front side of their respective pusher surfaces PS. Thus, the pusher surfaces PS of the blades 110-1-110-4 push sludge into the outlet 160 during every other time period TP.

By the above descriptions, it may be understood that the embodiments of the present invention provide apparatus for and methods of moving sludge 102 relative to the floor 106 of the basin 108, and to the outlet 160 or to the perimeter P, for example. The apparatus may include a plurality of blades, such as the exemplary blades 110-1 and 110-2, or the blades 110-1 through 110-4, or more than four blades 110. The blades 110 may each be configured to extend at least partly across the basin 106 in a parallel arrangement, and are shown in FIGS. 2B and 5A extending the entire way across the basin 108, for example. Also, a first member may include the first rail assembly 120 for carrying (i.e., supporting and moving) a first group of alternate ones of the blades (e.g., the blades 110-2 and 110-4) which are in the plane 118 adjacent to the floor 106. A second member may include the rail assembly 124 for carrying (i.e., supporting and moving) a second group of alternate ones of the blades (e.g., the blades 110-1 and 110-3) in the plane 118 adjacent to the floor 106. In this example, the drive 116 is configured to simultaneously and oppositely move the respective first and second members 120 and 124 and the respective first and second groups of alternate blades along the plane 118 relative to the floor 106 of the basin 108. The simultaneous and opposite movement is provided, for example, when the first group of alternate blades (e.g., blades 110-2 and 110-4) moves in the first direction 104 relative to the floor 106 and in opposition to the blades 110-1 and 110-3 of the second group. Such movement includes the second group of alternate blades 110-2 and 110-4 moving in the second direction 114 opposite to the first direction 104 and in opposition to the first group.

In more detail, this movement of each of the first and second groups of blades along the plane 118 and in the opposite directions 104 and 114 causes transfer of the material 102 by the blades 110-2 and 110-4 of the first group pushing the material 102 in the first direction 104 along the receiver surfaces RS of the blades 110-1 and 110-3 of the second group that are moving in the second direction 114. As a result, the pushed material 102 spills in the first direction 104 past the respective blades 110-1 and 110-3 of the second group to provide the spillover material 102SO adjacent to the pusher faces PS of the blades 110-2 and 110-4 of the second group. It may be understood that the drive 116 is configured to only pull on the first tensile member 122 and then pull on the second tensile member 126, each pull being in the first direction 104. In one pull (e.g., on member 122) the first group of alternate blades (e.g., 110-2, 110-4, etc.) is moved along the plane 118 across the floor 106 in the first direction 104. In the next pull (e.g., on member 126) the group of alternate blades (e.g., 110-1, 110-3, etc.) is moved along the plane 118 across the floor 106 in the first direction 104. The pull on the first tensile member 122 in the first direction 104 alternates with the pull on the second tensile member 126 in the first direction 104.

By the above descriptions, the following may be understood. An embodiment of the present invention may provide each of the blades 110 configured as a right triangle (FIGS. 3A and 3B) having a short (in the height direction h) pusher side PS perpendicular to the common plane 118, a long side 154 parallel to the plane 118, and a hypotenuse side (the receiver surface RS) inclined relative to the plane 118. In this example, each of the blades 110 has the short pusher side PS facing the desired direction 104 of sludge movement. As a result, in the movement of a first group of blades (e.g., 110-1 and 110-3) in the desired direction 104 (in opposition to the movement of a second group of blades, e.g., 110-2 and 110-4, moving opposite to the desired direction 104), the transfer of the sludge 102 is effected by the respective short pusher sides PS of the respective first group of blades 110-1 and 110-3 pushing the sludge 102 along the respective hypotenuses (surfaces RS) of the respective blades 110-2 and 110-4 of the second group. The pushing is to a front of the respective short pusher sides PS of the respective blades 110-2 and 110-4 of the second group of blades.

Still reviewing such descriptions, it may be understood that the drive 116 is configured to operate to alternately cause such movement. For example, such movement may occur during one time period TP in which the first member 120 and the exemplary first group of alternating blades 110-2 and 110-4 move in the first direction 104 relative to the floor 106. Such movement may also occur during the same time period TP in which the second member 124 and the exemplary second group of alternate blades 110-1 and 110-3 move in the second direction 114 relative to the floor 106.

The above-described spaced sequence of blades may be arranged in a different order (e.g., right-to-left as blades 110-1, 110-2, 110-3, and 110-4) so long as the orientation of the blades 110 is suitably related to the desired direction of movement of the sludge 102. That is, in one embodiment of the present invention there may be a blade orientation configured to move the sludge 102 in the "to" direction 104 to the sludge outlet 160, which in FIG. 5C is shown as being at the right end of the basin 108, with all of the blades 110 having the pusher surface PS facing to the right (the direction 104). Many such blades 110, e.g., four or six or eight, etc., may be used as described above.

Oppositely, another embodiment of the present invention may be used to move the sludge 102 in the "fro" direction 114 to a sludge outlet 160 that may be at the left end of the basin 108 (not shown). In this case, all of the blades 110 used for such purpose would have the pusher surface PS facing to the left (the direction 114). Again, many such blades 110, e.g., four or six or eight, etc., may be used. In this regard, referring to FIG. 6, another embodiment 100-4 of the present invention may be used when the sludge outlet 160 is at the center of the basin 108, between the walls 109E, for example. For clarity of illustration, the blades 110, the support assemblies 120 and 124, and the drive 116 of this embodiment are as described above with respect to FIG. 2B, except as described below, and the blades 110 and the support assemblies 120 are shown schematically as single lines. One section of blades 110-1 through 110-3, for example, may be located to the left of a central sludge outlet 160C. These exemplary blades 110-1 through 110-3 may be configured with the respective pusher faces PS facing to the right as viewed in FIG. 6. The respective blades 110-1, 110-2, and 110-3 may be arranged in the above-described spaced sequence, shown as an exemplary sequence defined from the far left of center to the near left of center by the blade 110-1 followed by the blade 110-2 followed by the blade 110-3.

Another set of blades 110-5 through 110-7, for example, may be located to the right of the sludge outlet 160C. Each of these blades 110-5 through 110-7 may be configured with the respective pusher faces PS facing to the left as viewed in FIG. 6, and may otherwise be configured the same as the blades 110-1 through 110-3. That is, similar to that described above with respect to FIG. 2B, the blades 110-5, 110-6, and 110-7 may be arranged in a spaced sequence, which may be an exemplary sequence defined from the far right of center to the near right of center by the blade 110-7 followed by the blade 110-6 followed by the blade 110-5. The drive 116 may be configured with the first support assembly 120 connecting the blades 110-2, 110-5, and 110-7, and with the second support assembly 124 connecting the blades 110-1, 110-3, and 110-6.

With the above-described six blades 110-1 through 110-3, and 110-5 through 110-7 in mind, it may be understood that the plurality of blades represented by the six blades 110 may be configured to provide a plurality of desired sludge transfer (or push) directions (e.g., 104L, for a left direction in FIG. 6, and 104R, for a right sludge transfer direction in FIG. 6). For descriptive purposes, two groups of such blades 110 may be defined. One group may be the blades 110-2, 110-5, and 110-7, all of which are driven by the first support assembly 120. A second group may be the blades 110-1, 110-3, and 110-6, all of which are driven by the second support assembly 124. Further, one may also define two pairs of blades 110 within each of these groups. The blades 110-1 and 110-2 may form one pair; the blades 110-2 and 110-3 may form another pair, both of the first group. The blades 110-5 and 110-6 may form one pair; and the blades 110-6 and 110-7 may form another pair of the second group. These blades 110-1 through 110-3 have the first orientation for moving the sludge in the sludge push direction 104R. For that purpose, the blades 110-1 and 110-3 move in opposition to the blade 110-2. The blades 110-5 through 110-7 have the second orientation for moving the sludge in the sludge push direction 104L. For that purpose, the blades 110-5 and 110-7 move in opposition to the blade 110-6.

With the blades 110-1 through 110-3, and 110-5 through 110-7 facing in the described respective directions 104L and 104R, and connected to the described respective support assemblies 120 and 124, the blades 110-1 through 110-3 move the sludge 102 in the desired sludge transfer (or push) direction 104R, and the blades 110-5 through 110-7 move the sludge 102 in the desired sludge transfer (or push) direction 104L.

Again, many other numbers of such blades 110, e.g., four or six or eight, may be used for each such set, e.g., on each of the left and right sides of the outlet 160C, for example, as may be required for the length L of the basin 108. In each example, the operation of the blades 110 of each such set is as described above with respect to FIGS. 5A through 5C, for example, and serves to transfer the sludge 102 in the respective direction 104R or 104L, and to deposit the respective sludge 102 into the exemplary sludge outlet 160C located at the center of the basin 108.

Referring again to FIG. 2B, for example, it may be understood that one embodiment of the drive 116 may be configured with the motor system 131 having a shared-reel drive 131 SR. Such shared-reel drive 131 SR may be the shared-reel drive described in U.S. Pat. No. 5,655,727, issued on Aug. 12, 1997, and entitled "Sludge Collector Method and Drive With Shared Reel For Taking Up and Paying Out Cables", the disclosure of which is incorporated by reference. The shared-reel drive 131 SR is effective to pull on the cables 130-1 and 130-2 one at a time. For example, referring to FIG. 5A, in one operation (see TP2, FIG. 5C), the cable 130-1 connected to the pull-only unit 128-1 is taken-up on the shared-reel drive 131 SR to move the blade 110-2 in the sludge movement direction 104 from position B1 to B2. At the same time, the drive 131SR pays-out the second cable 130-2 at the same rate as the cable 130-1 is taken-up (pulled in). Cable 130-2 is connected to the pull-only unit 128-2 so that the direction-reversal mechanism 132 pulls the blade 110-1 in the opposite direction 114 from position A1 to A2.

The shared-reel drive 131SR reverses. In a reverse operation during TP3, the drive 131 SR then takes-up (pulls on) cable 130-2 while paying-out cable 130-1. In the reverse operation, the pulled cable 130-2 moves the support assembly 128-2 and causes the blades 110-1, 110-3, etc., to move from their other positions back to their initial positions (e.g., the blade 110-1 from position A2 to position A1, FIG. 5C). At the same time, the drive 131SR pays-out the cable 130-1 at the same rate as the cable 130-2 is taken-up. The payed-out cable 130-1 is connected to the pull-only unit 128-1, so that when the direction-reversal mechanism 132 pulls, the blades 110-2, 110-4, etc. move in the opposite direction 114 from position B2 to B1. The shared-reel drive 131 SR then again reverses. The reversal occurs at the end of each time period TP.

Figure 7A:
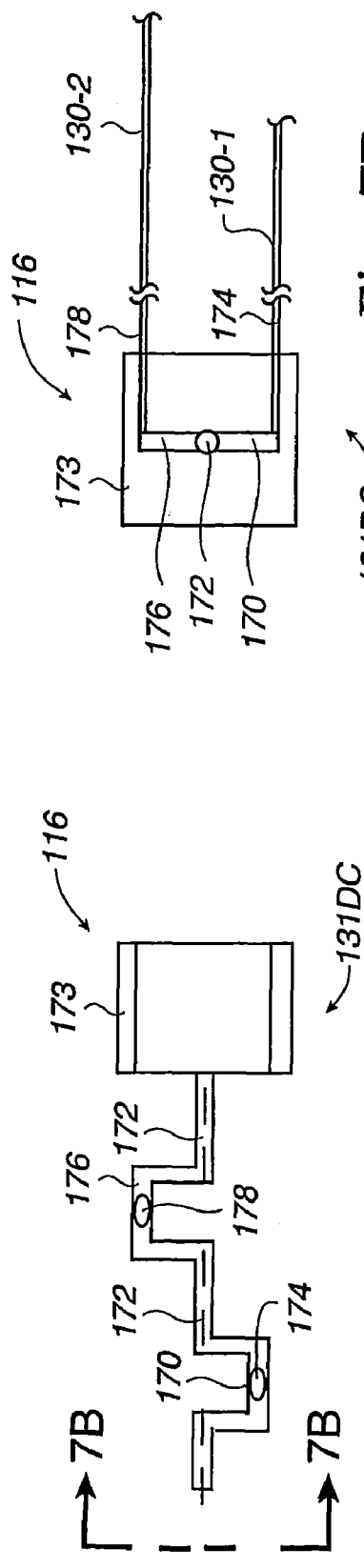
FIGS. 7A, 7B, 7C, and 7D illustrate embodiments of a drive of the present invention in which pull-only forces are applied to blades movable in each of first and second opposed directions to move the sludge in the first direction.
Figure 7B:

Referring to FIGS. 7A and 7B, it may be understood that another embodiment of the drive 116 may be configured with the motor system 131 having a dual-crank drive 131DC. The drive 131DC may include one crank 170 mounted on a drive shaft 172 which is configured to rotate. An alternating rotary drive 173 rotates the shaft 172 through an appropriate number of degrees, and stops, and then reverses the direction of rotation, and then stops, and reverses again, etc. The crank 170 is connected to one cable 174 and in one rotational direction pulls on the cable 174. A second crank 176 is also mounted on the drive shaft 172. The second crank 176 is connected to a second cable 178 and in an opposite rotational direction pulls on the cable 178. A pull by the first crank 170 on the cable 174 occurs at the same time as the second crank 176 releases the other cable 178. A pull by the crank 176 on the cable 178 occurs at the same time as the crank 170 releases the other cable 174. The cables 174 and 178 are secured to respective pull-only cables 130-1 and 130-2 (FIG. 7B) to move the respective support assemblies 120 and 124 as described above. The motor system 131DC also causes operation of the direction-reversal mechanism 132, as described with respect to FIG. 2B, for example.

Figure 7C:
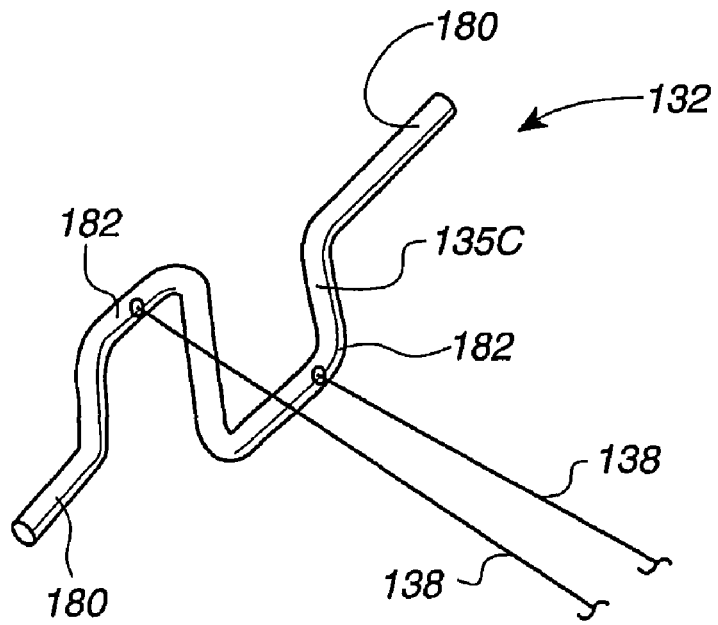

Alternatively, in another embodiment of the present invention, the drive 116 may be configured with the dual-crank drive 131DC used with another embodiment of the direction-reversal mechanism 132 configured with an idler crank 135C as shown in FIG. 7C. The idler crank 135C rotates on an idler shaft 180. The one cable 138 of FIGS. 2B and 5A (extending around pulley 135) may be cut and the cut ends may be attached to opposite arms 182 (FIG. 7C) of the idler crank 135C for operation in a manner similar to the idler pulley 135.

Figure 7D:
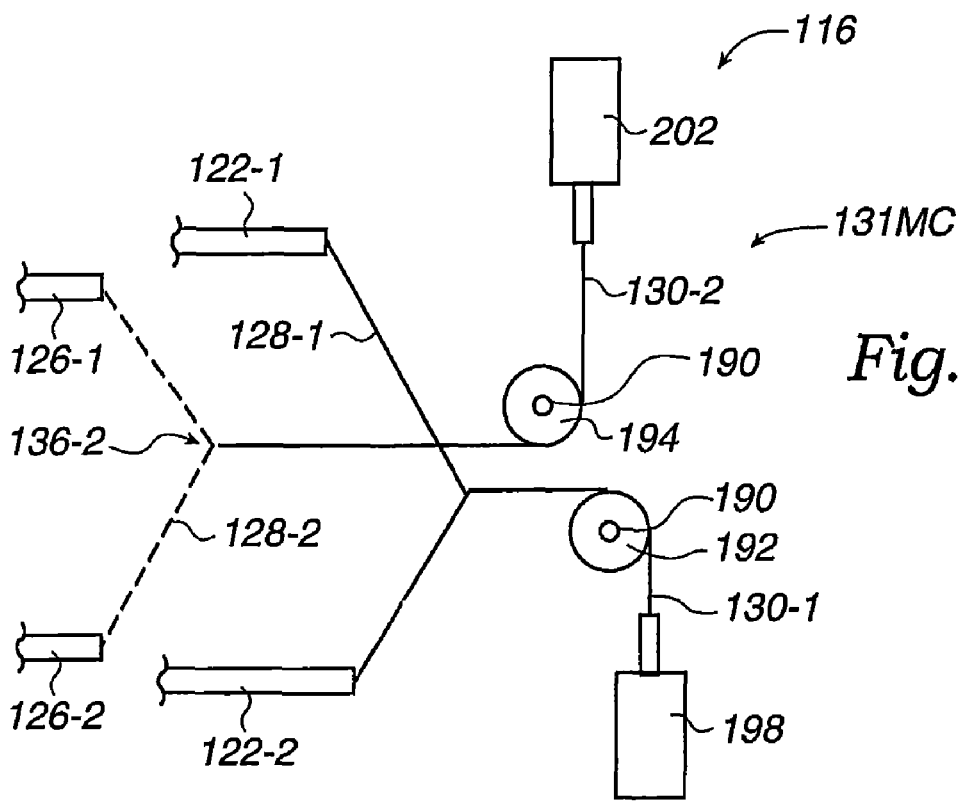

Referring to FIG. 7D, it may be understood that another embodiment of the drive 116 may be configured with the motor system 131 as a multi-cylinder drive 131MC. Idler shafts 190 mount a pair of spaced idler pulleys 192 and 194 for rotation. One idler pulley 192 guides the pull-only cable 130-1 from a first cylinder-piston motor 198 to the pull-only unit 128-1. The second idler pulley 194 guides the pull-only cable 130-2 from a second cylinder-piston motor 202 to the pull-only unit 128-2. Actuation of one motor 198 pulls the cable 130-1 around the idler pulley 192 and pulls on the unit 128-1. Actuation of the other motor 202 pulls the pull-only 130-2 around the idler pulley 194 and pulls on the unit 128-2. Actuation of the motors 198 and 202 alternates, with an un-actuated motor 198 or 202 releasing the respective pull-only cable 130-1 or 130-2. Thus, a pull on the cable 130-1 occurs at the same time as the second motor 202 releases the other cable 130-2. A pull on the cable 130-2 occurs at the same time as the motor 198 releases the other cable 130-2. Thus, the cables 130-1 and 130-2 are moved in a manner similar to the cables 130-1 and 130-2 described above with respect to FIG. 2B, for example. This embodiment of the drive 116 may also be used in conjunction with the direction-reversal mechanism 132, as shown in FIG. 2B, or with the idler crank 135C shown in FIG. 7C, for example.

Referring to FIGS. 8A through 8C, and to FIG. 9A, an embodiment of the present invention may be illustrated as a method of moving the material 102 along the floor 106 of the basin 108. Such method is illustrated in a flow chart 210 shown in FIG. 9A as including an operation 212 of defining a first space for a portion of the material 102 (e.g., sludge). The portion may be that part of the sludge 102 received between opposed ones of the blades 110-1 and 110-2, and extending between opposite walls of the basin, for example (FIG. 8A). The first space may be space 214 (FIG. 8A) having a first volume that may extend across the basin and being adjacent to the floor 106. As a reference, the positioning of the blades 110-1 and 110-2 in FIG. 8A corresponds to the positioning shown in FIG. 3A of the blades 110-1 and 110-2, i.e., a maximum separation MAX. In regard to FIG. 5C, this maximum separation MAX may occur at the exemplary time t0, e.g., at the beginning of the exemplary time period TP1.

The method moves to an operation 216 of reducing the size of the first volume of the first space. The reduced volume may be identified by 214R in FIG. 8B and may extend across the basin. Operation 216 may be performed by moving the pusher face PS relative to the receiver surface RS (FIG. 8B). The pusher face PS is a first vertical pusher of the first blade 110-1, and the receiver surface RS is a first inclined pusher of the second blade 110-2. This relative movement is shown in FIG.

8B reducing the value of the first volume of the first space 214, and may occur in the next time period TP2, for example. Such reduction results in pushing the portion of the material 204. The portion corresponds to the spillover sludge 102SO so that a first spillover volume 218SO-1 (FIG. 8B) of the portion of the material 106 is pushed out of the reduced first volume (see arrow 102SO) and past the second inclined pusher surface RS of blade 110-2 in the first direction 104. The transfer of the first spillover volume 218SO-1 in the first direction is thus complete, and the method is done.

Another aspect of the method of the present invention is shown in FIGS. 8C and 9B, and includes a further operation 222 of a flow chart 224 in which the method of FIG. 9A is performed. As a preface to a next operation 226, FIG. 8B shows the first spillover volume 218SO-1 having been pushed past the first inclined pusher surface RS and having entered a second space 226 having a second volume. The volume of the second space 226 is equal to the volume of the first space 214. The second volume of the space 226 (now identified by 226E in FIG. 8B) has previously become enlarged in the operation 226, e.g., by the motion of the blades 110-2 and 110-3 moving to respective positions B1 and C1 (FIG. 5C) during TP1. Time t1 in FIG. 5C corresponds to the positions between the blades 110-2 and 110-3 that provide the MAX distance. FIG. 8C shows that the method of FIG. 9B may include the operation 228 of reducing the size of a second volume of the second space 226 (now identified as 226R in FIG. 8C). The volume of the second space 226E is reduced by moving the blade 110-2 in the first direction 104 and the blade 110-3 in the second direction 114. A vertical pusher surface PS attached to the inclined pusher surface RS of the blade 110-2 thus moves toward the blade 110-3, thus toward the inclined pusher surface RS and toward the third vertical pusher surface PS of the blade 110-3. These movements of the blades 110-2 and 110-3 are into (and reduce) the second volume of the second space 226E (FIG. 8B) to form the reduced space 226R. These movements are effective to push (see dashed arrow 102SO, FIG. 8C) a second spillover volume 218SO-2 of the material 102 past the third vertical pusher surface PS (of the blade 110-3) in the first direction 104 and out of the second volume of the second space 226R and adjacent to (and in front of) the third vertical pusher surface PS of the blade 110-3, and the method is done.

Referring to FIGS. 2C, 4A through 4D, and to FIGS. 9A and 9B, an embodiment of the present invention may be illustrated as a method of moving the material 102 along the floor 106 of the basin 108 from the corner 109C. Such method is also illustrated in the flow chart 210 shown in FIG. 9A and the flow chart 224 shown in FIG. 9B. The operation 212 may define a first space for a portion of the material 102 (e.g., sludge). Referring to FIG. 4C, the portion may be that part of the sludge 102 received between the one blade 110-1 and the corner walls 109E and 109L of the basin, for example. The first space may be space 300 (FIGS. 4A & 4C) shown having a first volume and being adjacent to and above the floor 106 and extending from the blade 110-1 to the corner walls 109E and 109L.

The method moves to the operation 216 of reducing the size of the first volume of the first space. The reduced volume is identified by 300R in FIGS. 4A & 4B. Operation 216 may be performed by moving the pusher face RS of blade 110-1 relative to (i.e., toward) the walls 109E and 109L (FIG. 4B), also shown in FIG. 4A with respect to wall 109E. As described above with respect to FIG. 4A, as the blade 110-1 approaches the wall 109E (which is also exemplary of the blades moving toward the wall 109L), sludge 102 that has been pushed toward the wall 109E spills over the blade 110-1 (see arrow SO) and moves past the blade 110-1 in the desired direction 104C (and is shown as 102SO, FIG. 4A). In terms of operation 216, there is a second space 302 between the blade 110-1 and blade 110-2 (FIGS. 4A & 4B).

The method moves to flow chart 224 (FIG. 9B). Having done operation 222, the method moves to operation 226 in which the second space 302 is defined. The second space 302 is shown having a second volume defined from adjacent to and above the floor 106 and extending from the blade 110-1 to the blade 110-2. With the blade 110-1 at the position Z1 and blade 110-2 at position Z2, space 302 is large relative to space 300R (FIG. 4A). The method moves to operation 228. Referring to FIG. 4C for an understanding of this operation, the second space 302 has become reduced (shown as 302R2) in that blade 110-1 has moved away from the walls 109E and 109L and blade 110-2 has moved from position Z2 to ZBS. Such reduction results in pushing the portion 102SO of the material 204 away from the walls and toward the blade 110-2 that is at the same time moving toward the walls (toward position ZBS). The portion corresponds to the spillover sludge 102SO (plus other sludge). The portion is pushed out of the reduced second volume 302R2 and past the second blade 110-2 in the first direction 104C. This aspect of the method is done.

Figure 9C:
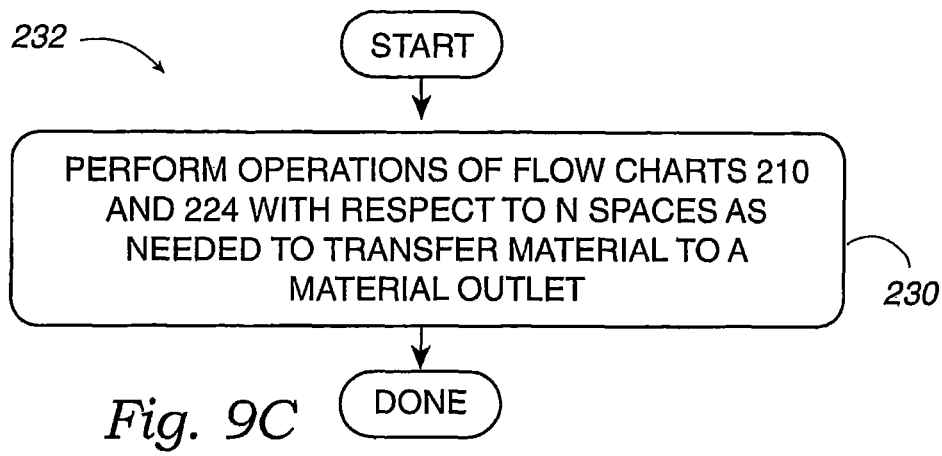
Figure 10:
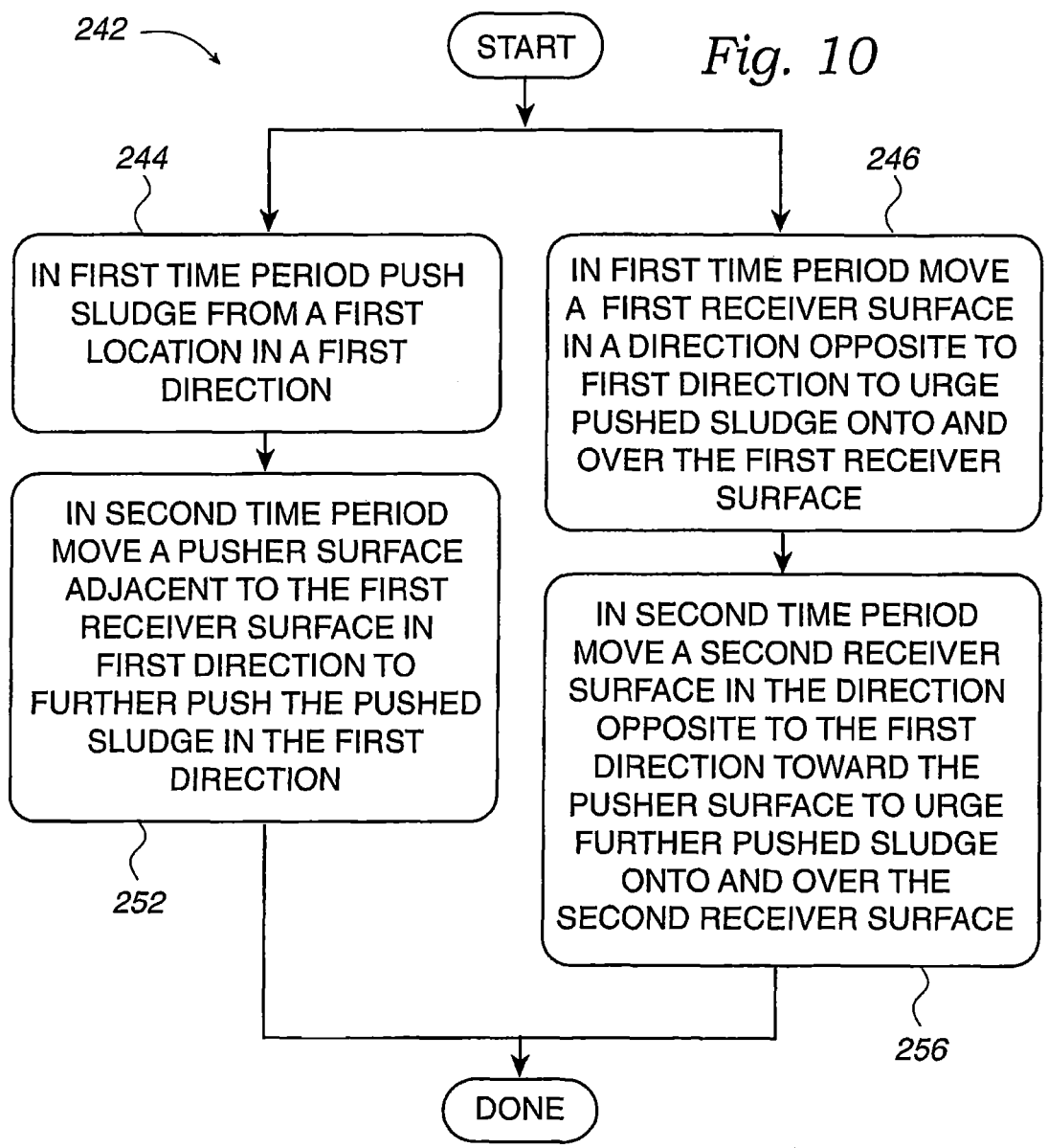

Another aspect of the method of the present invention is shown in FIGS. 8C and 9C, and includes an operation 230 of the flow chart 232. Operation 230 repeats the respective operations of flow chart 210 (FIG. 9A). Thus, there is an alternating reducing of the first and second volumes of the respective spaces 214 and 226. The repeating alternately occurs so that the first volume of the first space 214 is reduced simultaneously with an enlarging of the second volume of the second space 226, and the second volume of the second space 226 is reduced simultaneously with an enlarging of the first volume of the first space 214. The operation 230 is performed with respect to as many of the spaces as are necessary to transfer the sludge 102 to the outlet 160. For example, FIG. 8A shows four blades 110. Between those blades two spaces 214 and one space 226-R are defined and the sludge 102 is transferred from the blades 110-1, 110-2, 110-3, and 110-4 to the outlet 160. Thus, three exemplary spaces are provided in this exemplary operation 230. Other numbers of spaces may be provided depending on the size of the basin and the value of the distance D (FIG. 3A) through which the blades 110 are moved. These operations result in sludge transfer in the sludge transfer direction 104, as indicated by the spillover volumes 218SO-1 and 218SO-2, for example (FIGS. 8B and 8C). When the desired amount of sludge 102 is transferred to the sludge outlet 160, the method is done.

Referring to FIGS. 2C, 4A through 4D, and to FIG. 9C, another embodiment of the present invention may be illustrated as another aspect of a method of moving the material 102 along the floor 106 of the basin 108 from the corner 109C. The other aspect also includes the operation 230 of the flow chart 232. Operation 230 repeats the respective operations of flow charts 210 and 224. Thus, there is an alternating reducing of the first and second volumes of the respective spaces 300 and 302. The repeating alternately occurs so that the first volume of the first space 300 is reduced (FIGS. 4A & 4B, space 300R) simultaneously with the enlarging of the second volume of the second space 302 (FIG. 4B). This may occur as blade 110-1 moves to position Z1. Also, in the same time period TP in which space 300 was reduced to 300R (FIGS. 4A & 4B), FIG. 4C also shows that there is a third space 304 in front of the blade 110-2 toward the perimeter P as blade 110-2 moves in direction 104C to position Z2. Operation 230 is performed by so moving both the blade 110-1 toward the walls to position Z1 and moving the blade 110-2 to the perimeter P to position Z2 so that the spillover sludge 102SO from the walls (and now in front of blade 110-2) is moved to the perimeter P. FIG. 4B shows this spillover sludge 102SO inside the perimeter P. When the desired amount of sludge 102 is transferred from the walls to perimeter P, the method is done.

Another aspect of the method of the present invention is shown in FIGS. 4B, 4C, 4D, 5C, and FIG. 10, which shows a flow chart 242. The method moves sludge 102 from a first location (e.g. A2, FIG. 5C, or Z1, FIG. 4B) in the settler basin 108 to a second location (e.g., outlet 160, FIG. 5C, or perimeter P, FIG. 4B) in the settler basin. The respective exemplary first and second locations A2 and 160, or Z1 and P, are spaced in the first direction 104. This method may include an operation 244 of pushing some of the sludge 104 from the first location A2, which may be performed during a time period TP1. The pushing is in the first direction 104. At the same time as operation 244 is performed, the method performs an operation 246. In operation 246 the receiver surface RS of blade 110-2 is moved opposite to the first direction 104 (i.e., is moved in the second direction 114) and into the sludge 102 that is being pushed during operation 244. A result of operations 244 and 246 is that a portion of the sludge that is pushed in the first direction 104 is pushed onto and over, or past, the receiver surface RS of blade 110-2 so that the portion is moved toward the second location 160.

In respect to FIG. 4B, operation 244 may be performed by the blade 110-1 moving from position Z1 to position ZBS, and operation 246 may be performed by blade 110-2 moving from location Z2 to position ZBS. As described above, these movements of blades 110-1 and 110-2 result in sludge 102SO spilling over to the right of blade 110-2 as viewed in FIG. 4C at position ZBS.

Another embodiment of the method of flow chart 242 (FIG. 10) is to move the sludge 102 further along the floor 106 of the settler basin 108 in the first direction 104. The method may include an operation 252 performed in a second time period TP2 following the first time period TP1. The blade 110-2 (FIG. 8A) is configured elongated with a right-triangular configuration so that a pusher surface PS and a receiver surface RS meet at an acute angle. Operation 252 moves the blade 110-2 in the first direction 104 to move the pusher surface PS and further push the sludge in the first direction. FIGS. 8B & 8C show this movement of blade 110-2 to position B2. The method moves to an operation 256 in which receiver surface RS of a third blade 110-3 is opposite and adjacent to the pusher face PS of the blade 110-2. In operation 256 the blade 110-3 is moved in the second direction 114 so that the pusher face PS of the moving blade 110-2 pushes some of the sludge onto and over the receiver surface RS of the blade 110-3, and the method is done. FIGS. 8B & 8C show this movement of blade 110-3 to position C2.

The operation 252 of flow chart 242 may also be illustrated by reference to FIGS. 4A & 4B. Operation 252 may occur in TP2 with the pusher surface PS of blade 110-2 moved in the direction 104C further away from the walls 109E and 109L. Such further movement of the blade 110-2 is by the pull-only cable 130-4 pulling on the tensile member 126-3 to render the tensile member 122-3 taut between the pulleys 135-2-1 and 135-2-2. This further movement of blade 110-2 is shown as movement from the position ZBS to position Z2 (FIG. 4B).

Figure 11:
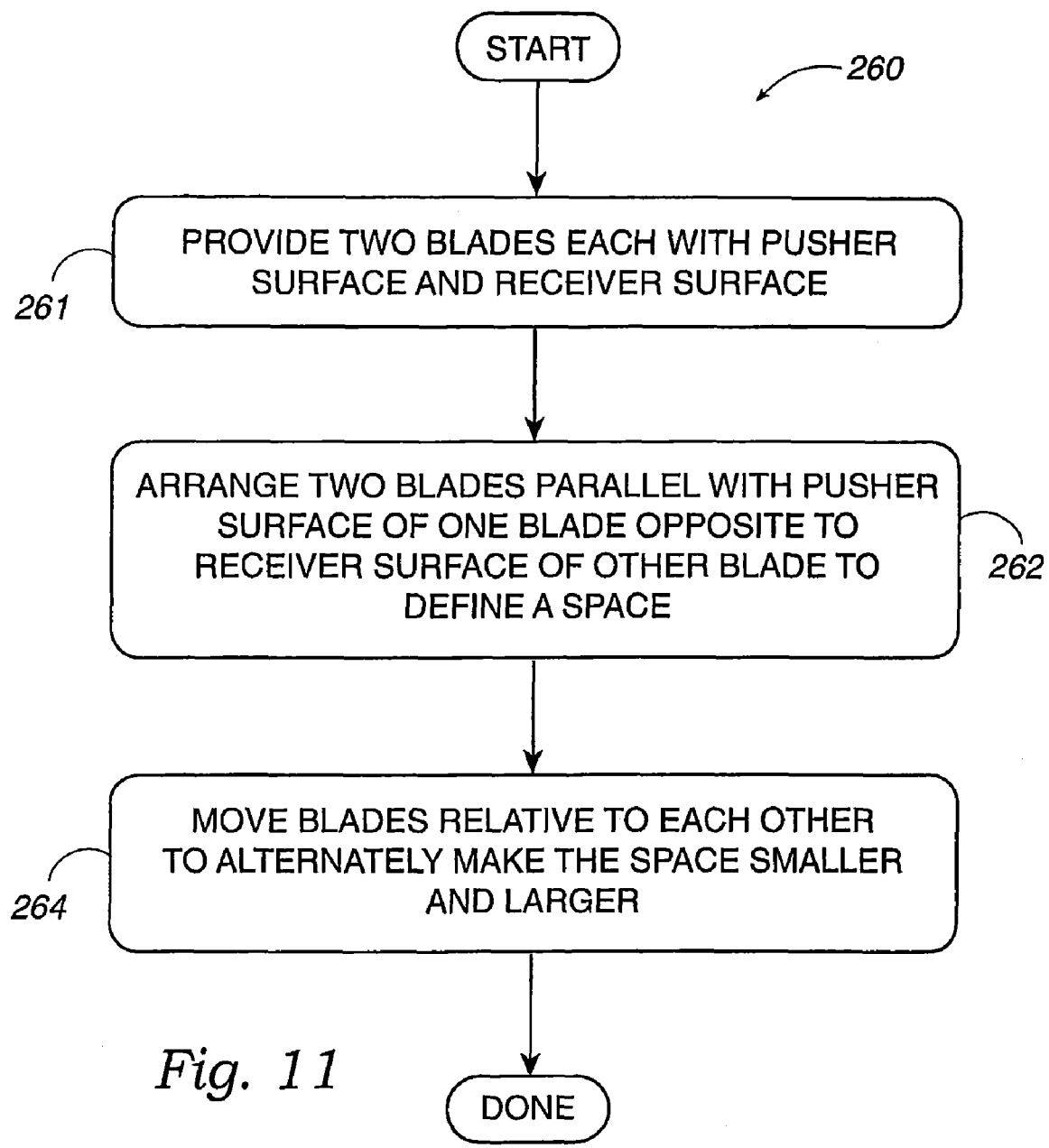

Another embodiment of the method of the present invention relates to flow chart 260 shown in FIG. 11. Spaces between blades (shown in FIGS. 8A-8C) are referred to in operation 264 of flow chart 260. In an operation 261, each of two blades is provided with pusher and received surfaces. These may be exemplary blades 110-2 and 110-3 shown in FIG. 8A, for example, having the elongated right triangular cross section configuration. The method moves to operation 262 in which the two blades are arranged parallel with the pusher surface PS of one blade facing the receiver surface RS of an adjacent blade. The exemplary blades 110-2 and 110-3 are shown so arranged in FIGS. 5A & 8B (surfaces facing). The method moves to operation 264 and the blades are moved relative to each other. This may be as shown in FIGS. 8B and 8C, where the moving of the blade 110-2 is in the first direction 104 and then in the second direction 114, and the blade 110-3 is moving oppositely to each such direction. The moving makes the space 226 defined between these two blades 110-2 and 110-3 alternately smaller (226R) and larger (226E). As a result, the pusher surface PS of the blade 110-2 further pushes the sludge in the first direction 104 as the space is made smaller, and some of the sludge pushed in the first direction 104 is pushed onto and over, or past, the receiver surface RS (past the blade 110-3, FIG. 8C), and the method is done.

In other embodiments of this method of FIG. 11, the providing operation 261 may provide two additional blades 110-3 and 110-4 (FIG. 8A). Each of the additional blades 110-3 and 110-4 may also be configured elongated with a right-triangular cross-sectional configuration so that a pusher surface PS and a receiver surface RS meet at an acute angle. The arranging operation 262 also arranges the additional two blades 110-3 and 110-4 in parallel relationship with the pusher surface PS of the blade 110-2 being opposed to the receiver surface RS of the additional blade 110-3 to define another large space 214E (FIG. 8B). During the operation 264 of causing relative movement to make the space 214E smaller as in FIG. 8B (se 214R), the opposed blades 110-3 and 110-4 move closer together and are effective to move the sludge 102 across and past the receiver surface RS of the blade 110-4 (FIG. 8B, 102SO-2). The drive 116 reverses and the blades 110-3 and 110-4 are moved to the positions shown in FIG. 8A so that the space 214R becomes larger again (see 214E, FIG. 8A), and the method is done.

The operation 261 of flow chart 260 may also be illustrated by reference to FIGS. 2C, 4A, 4B and 4C. Another embodiment of operation 261 may be to provide the all-curved blades 110-1 and 110-2 shown in FIG. 4A having the receiver and pusher surfaces RS and PS respectively. Operation 262 may be performed as shown in FIGS. 2C and 4C with the blades being generally parallel with receiver surface RS of blade 110-2 opposite to pusher surface PS of blade 110-1. The referenced space is 302 (FIG. 4B) between the two blades. Operation 264 is performed in the above-described manner with the space 302 having a maximum value as shown in FIG. 4B and a minimum value 302R2 as shown in FIG. 4C, 302R2 indicating a reduced value of space 302 identified as reduced by reference 302R. The drive 116 reverses and the space 302 is as shown larger in FIG. 4B, and the method is done.

Figure 12:
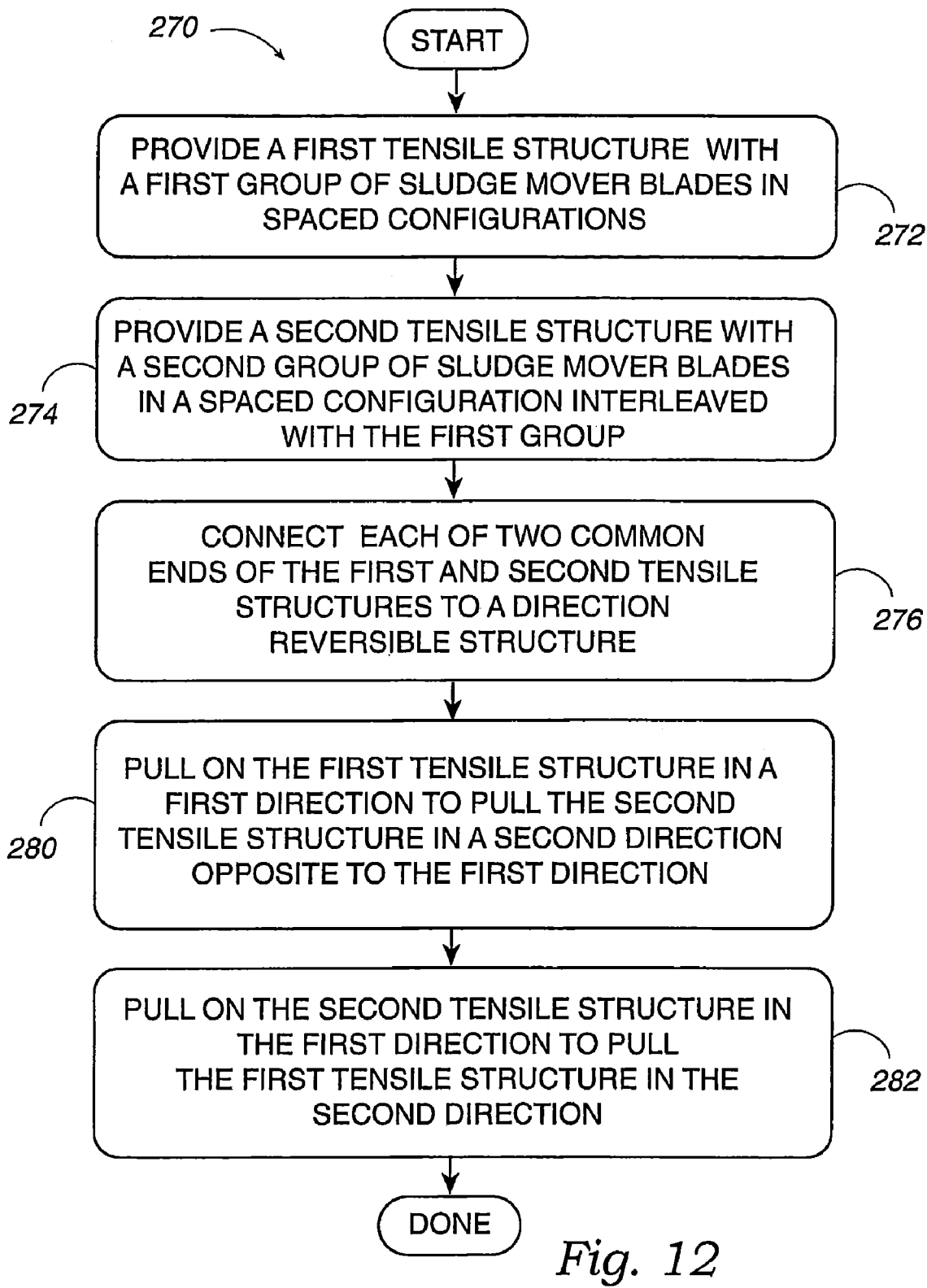

Another embodiment of the method of the present invention is shown in FIG. 5A, and in FIG. 12 which shows a flow chart 270. This method moves sludge 102 along the floor 106 of the basin 108. The method moves to an operation 272 which provides a first tensile structure, such as the first rail assembly 120 and first rails 122-1 and 122-2 (FIG. 5A), with a first group of sludge mover blades, such as blades 110-2 and 110-4, adjacent to the floor 106. The method moves to an operation 274 of providing a second tensile structure, such as the second rail assembly 124 and second rails 126-1 and 126-2 (FIG. 5A) with a second group of sludge mover blades 110-1 and 110-3 adjacent to the floor 106. Each such group is in a spaced configuration. The blades 110-2 and 110-4 of the first group alternate with the blades 110-1 and 110-3 of the second group in the common plane 118 adjacent to the floor 106. Other numbers of blades 110 may be provided in each group, such as the four shown in FIG. 5C.

The method moves to an operation 276 of connecting a cable, such as the reverse-direction cable 138, to common ends of a first tensile structure (e.g., 122-1 and 122-2) and a second tensile structure (e.g., 126-1 and 126-2). The cable 138 may be secured to pull-only yokes 134-1 and 134-2. The cable 138 is connected to the direction reversal mechanism 132 (FIGS. 5a & 7D) to reverse the direction of the cable 138.

The method moves to an operation 280 of pulling on the first tensile structure (which may be via the drive 116 and pull-only yoke 128-1) to move the first tensile structure 122-1 and 122-2 and the first group of sludge mover blades 110-2 and 110-4 in the first direction 104. The first tensile structure 122-1 and 122-2 pulls on the direction-reversing yoke 134-1, which pulls on cable 138. Mechanism 132 reverses direction of the cable 138, which pulls on the second tensile structure 124 to move the second group of sludge mover blades 110-1 and 110-3 in the second direction 114 opposite to movement of the first group of sludge mover blades 110-1 and 110-3. The moving groups of blades 110-1 through 110-4 move the sludge 102 along the floor 106 in the first direction 104.

The method moves to an operation 282 of pulling on the second tensile structure to move the second group of sludge mover blades 110-1 and 110-3 in the first direction 104. The pulling may be by pulling the pull-only drive cable 130-2 so that the tensile structure 124 pulls on the cable 138 and the reversed direction portion of cable 138 pulls on the tensile structure 120 to move the first group of sludge mover blades 110-2 and 110-4 in the second direction 114 opposite to this movement 104 of the second group of sludge mover blades 110-1 and 110-3. The moving groups of blades 110-1 through 110-4 continue to move the sludge 102 along the floor 106 in the first direction 104.

Also based on this description of the embodiment of FIG. 12, it may be understood that such embodiment may be used to move sludge from the corner 109C. FIG. 4B shows the first location Z1 in the basin 108 is in the corner 109C defined by the intersection of the two adjacent walls 109E and 109L of the basin. The second location Z2 is away from those walls and out of the corner 109C. With this in mind, to move sludge out of the corner, the operations 272 and 274 provide the respective tensile member 126-3 and 122-3. Also, in operation 276 there is a mounting of a first pulley (e.g., 135-2-1, FIG. 4B) against one of the walls (e.g., 109E) and spaced from the corner 109C. Also, a second pulley (e.g., 135-2-2, FIG. 4B) is mounted against the other of the walls (e.g., 109L) and spaced from the corner. Also, the connecting of operation 276 may be by connecting members 122-3 and 126-3 to extend around those first and second pulleys for direction reversal. Thus, (FIG. 4C) a first section may be configured as the tensile support 122-3 with a blade 110-2. A second section may be configured as the tensile support 126-3 with blade 110-1. With this configuration, the nomenclature of the directions is reversed, with 114C being a first direction and 104C being a second direction. Operation 280 results in pulling on the first section 122-3 in a first direction 114C opposite to the second direction 104C, causing the reversed second section (tensile support 126-3) in the second direction 104C and the blade 110-1 to push some of the sludge from the first location Z1 toward the second location Z2, the pushing being in the second direction 104C and onto the first blade 110-2. Also, pulling on the first section 122-3 is effective to move the first pusher (blade 110-2) in the first direction 114C opposite to the first direction 104C into the pushed sludge (pushed by blade 110-1, FIG. 4C). The pushing of some of the sludge by the second section (tensile support 126-3) is effective to push some of the sludge in the second direction 104C past the first section (tensile support 123-3) and past the pusher (blade 110-2) toward the second location Z2. Operation 282 then results in pulling on the second section 126-3 in the first direction 114C so direction reversal pulls the first section 122-3 taut (FIG. 4B) in the second direction 104C to cause the blade 110-2 to push the sludge 1025) to the perimeter P.

Figure 13B:
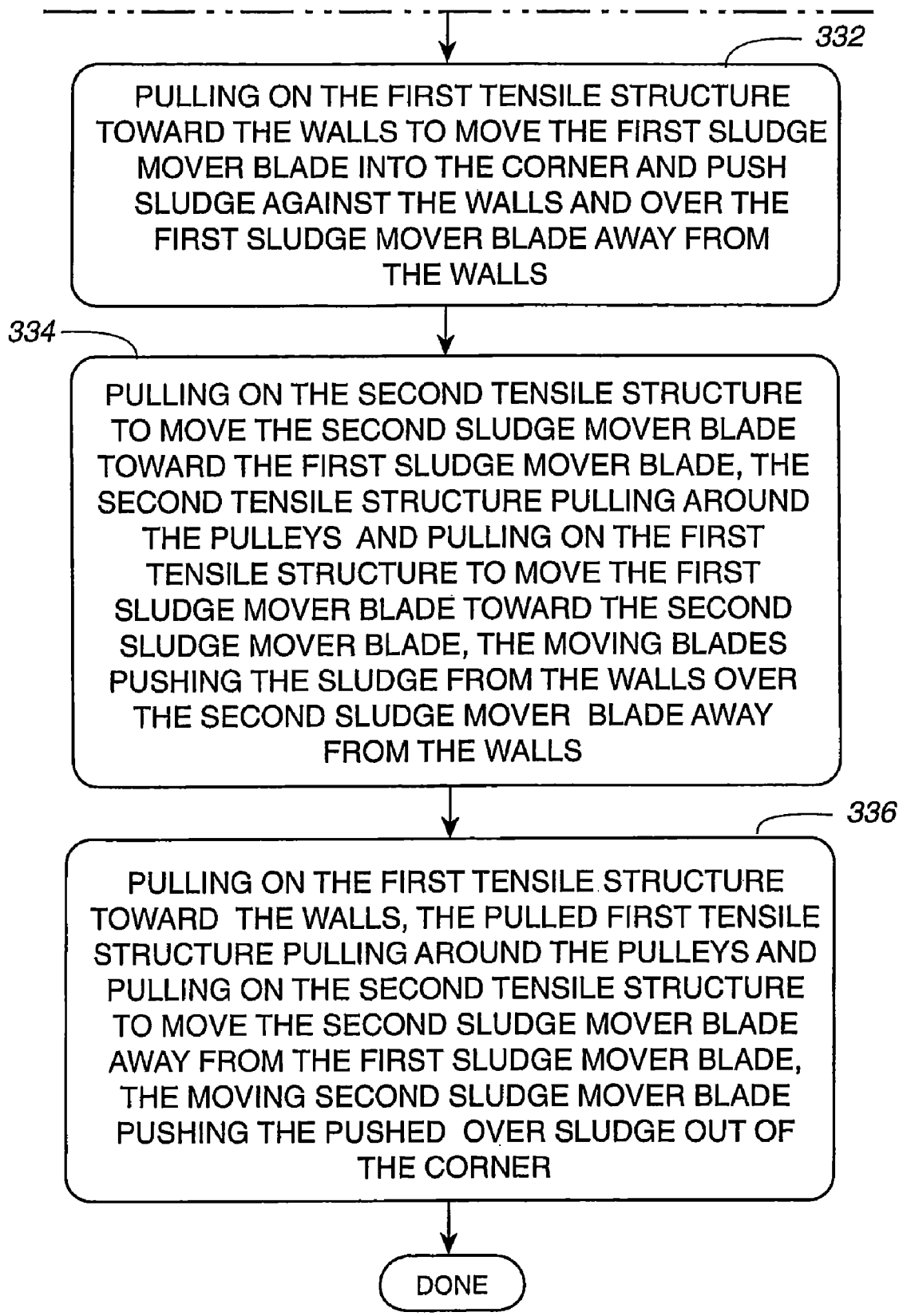

Another embodiment of the method of the present invention is shown in FIGS. 2C, 4A through 4C, and in FIG. 13 which shows how FIGS. 13A and 13B combine to show a flow chart 320. This embodiment moves sludge 102 out of the corner 109C of the basin, and is described in terms of an endless loop 328 shown in FIGS. 2C, 4B and 4C. The method moves to operation 322 of providing a first tensile structure connected to a first sludge mover blade adjacent to the floor. The first structure may be tensile support 126-3 with blade 110-1, FIG. 4B. The method moves to operation 324 of providing a second tensile structure connected to a second sludge mover blade adjacent to the floor. The structure may be tensile support 122-3, with blade 110-2, FIG. 4B. The first and second blades 110-1 and 110-2 are adjacent to each other in the common plane 118 that is adjacent to the floor 106. The method moves to operation 326 of connecting the first and second tensile structures to each other. Operation 326 may result in defining the endless loop. The loop may be the loop 328 identified at four places along the endless extent of the connected supports 126-3 and 122-3 (see FIGS. 2C, 4B & 4C. The loop 328 is defined by the connected supports 122-3 and 126-3. The method moves to operation 330 of extending the loop around spaced pulleys, a first pulley being adjacent to a first of the walls and a second of the pulleys being adjacent to a second of the walls. The spaced pulleys may be respective first and second pulleys 135-2-1 and 135-2-2 and the loop may be loose around the pulleys to define slack in the loop. The first pulley may be adjacent to a first of the walls (e.g., 109E) and the second pulley may be adjacent to a second of the walls (e.g., 109L). The slack in the loop 328 is shown, for example, in FIG. 4B in that while the support 122-3 is tight or taut between the pulleys 135-2-1 and 135-2-2, the length of the support 126-3 between the pulleys (i.e., from the pulleys to the walls 109E and 109L) is in the above-described bent (or flexed) configuration that has a greater value than the distance between and around the pulleys. For ease of illustration, this value is not shown to scale. The method moves to operation 332 of pulling on the first tensile structure toward the walls to move the first sludge mover blade into the corner to push sludge against the walls and over the first sludge mover blade away from the walls. The pulling tightens the slack, as shown in FIG. 4B where the pulled first tensile structure 126-3 is shown pulling tightly around the pulleys and on the second tensile structure 122-3, tightening the slack and moving the second sludge mover blade 110-2 away from the first sludge mover blade 110-1. This pulling moves the first sludge mover blade 110-1 into the corner 109C to push sludge against the walls (FIG. 4A) and over the first sludge mover blade (see arrow SO, FIG. 4A) away from the walls. The pulled first tensile structure 126-3 is shown in FIG. 4B pulling tightly around the pulleys and on the second tensile structure 122-3 to further tighten the slack, which further tightening is shown by structure 122-3 being taut between the pulleys 135-2-1 and 135-2-2.

The method moves to operation 334 of pulling on the second tensile structure to move the second sludge mover blade toward the first sludge mover blade, the pulled second tensile structure pulling around the pulleys and on the first tensile structure to move the first sludge mover blade toward the second sludge mover blade, the moving blades pushing sludge over the second sludge mover blade away from the walls. The pulling may be on the second tensile structure 122-3 to move the second sludge mover blade 110-2 in direction 114C toward the first sludge mover blade 110-1. The pulled second tensile structure 122-3 pulls around the pulleys (FIG. 2C) to cause the structure 122-3 to flex. The pulled and flexed structure 122-3 pulls around the pulleys and on the first tensile structure 126-3. The structure 126-3 was at location Z1 (FIG. 4C), and by the pull of structure 122-3 acting around the pulleys structure 126-3 is moved in direction 104C and moves the first sludge mover blade 110-1 from location Z1 toward the blade stop location ZBS and toward the second sludge mover blade 110-2. These are the oppositely-moving blades 110-1 and 110-2 pushing sludge 102SO over the second sludge mover blade 110-2 away from the walls.

The method moves to operation 336 of pulling on the first tensile structure toward the walls, the pulled first tensile structure pulling around the pulleys and on the second tensile structure to move the second tensile structure and the second sludge mover blade to push the sludge out of the corner. The pulling may again be on the first tensile structure 126-3, and is toward the walls 109L and 109E. The pulled first tensile structure 126-3 pulls around the pulleys and pulls on the second tensile structure 122-3. The structure 122-3 was flexed (FIG. 4C). The pull by the structure 126-3 removes the flex, and moves the second tensile structure 122-3 and the blade 110-2 into the taut configuration shown in FIG. 4B. As the second sludge mover blade 110-2 on the second tensile structure 122-3 both become taut, the blade 110-2 pushes the sludge 102SO to the perimeter P, which is adjacent to the location Z2 (FIG. 2C). The method is done.

By the above description, it is seen that embodiments of the present invention meet all of the above needs by providing sludge moving apparatus and methods. The present embodiments move adjacent blades 110 at the same time but in opposite directions. In this manner, these embodiments overcome the prior tendency for undesired movement of sludge in the return direction 114 due to all scrapers moving together at the same time in the return direction. The present embodiments also provide thin tensile members, e.g., 122-1, which further overcome the prior tendency caused by the one net 32 (FIG. 1A) attached to and moving with all of the prior scrapers at the same time. Also, by providing the thin tensile members, e.g., 120, 124, 128, and 138, commercial embodiments of the present invention do not require the prior reinforced net 32 driven by the structural drive member that has high resistance to both tension and compressive forces exerted parallel to the directions 34 and 36. Rather, there are pull-only structures, e.g., 128-1, 130-2, and 122-1, having high resistance to only tension force and virtually no resistance to compressive forces. Without such extra structural member, there may be reductions in the cost and weight of the present commercial embodiments, and reduction of energy required to move the blades 110 through the sludge 102.

It is also seen that embodiments of the present invention meet all of the above needs by using the same speed of movement in the desired direction 104 (and 104C) and in the return direction 114 (and 114C), which avoids the disadvantages of the prior higher speed for the return stroke than for the forward stroke (e.g., 12 m/minute return vs., 3 m/minute forward). The present same speeds avoid the prior agitation of the sludge particles, avoiding a cause of reintroducing settled particles into the liquid that was clarified by the settler, and increasing efficiency of the overall operations.

It is also seen that embodiments of the present invention meet all of the above needs by not having all blades 110 push the sludge in the direction 104 in the same time period TP. Thus, all of the blades 110 do not push the sludge with the pusher surface PS at the same time. The present embodiments avoid this by only pushing one-half of the pusher surfaces blades 110 through the sludge at the same time in the "to" direction 104. Thus, the total resistance by the sludge on the blades may reduce by one-half the power previously required to push all of the pusher surfaces (e.g., 46) of the scrapers through the sludge at the same time.

It is also seen that embodiments of the present invention meet all of the above needs by enabling use of a lower-power motor 131, as compared to that required to push all of the pusher surfaces 46 of the scrapers through the sludge at the same time in the to direction. The motor 131 requires less power for the present sludge pushing and due to the decreased weight without the prior extra compressive member.

It is also seen that embodiments of the present invention meet all of the above needs by providing the tensile structures that are more compliant with respect to uneven floors of the basin, which in turn results in lower costs to initially provide a smoother floor for the basin (e.g., of concrete) and lower repair costs in fixing the floor of the basin during repair.

It is also seen that embodiments of the present invention meet all of the above needs by providing alternatives to the prior generally-triangular cross-section scrapers, which require additional cost to manufacture the convex and concave shapes of the scrapers 40.

It is also seen that embodiments of the present invention avoid the need, in actual commercial practice, for the use of any structural drive member other than the separate rails 122 and 126 that carry the respective blades themselves. This is by applying only tension, or pull, forces to each of the separate rails, and by connecting one rail motor system 140 to each of the separate rail assemblies (120 and 124) so that a pull force applied to one yoke 130-2 and rails 122-1 and 122-2 in one (e.g., forward, or "to") direction is applied by those rails (via the yoke 130-1) to the other rails 126-1 and 126-2 in the opposite (e.g., return, or "fro") direction. In this manner, each rail 122 and 126 may be fabricated from material having minimum, or reduced, structural characteristics. Such material need have a characteristic of high resistance only to tension forces, and need have low (or no) resistance to compressive forces. This characteristic greatly reduces the cost of the sludge collection system, yet each rail 122 and 126 is structurally sufficient to carry and drive the blades 110 through the sludge 102 as the respective rail 122 or 126 moves across the bottom 106 of the basin. As a result of the new combination of the low-cost blades 110 with the significantly improved configuration of the drive 116, during the respective "to" and "fro" movements the blades 110 resist those tension forces and the drive 116 does not apply compressive forces to the rails. Thus, the present invention eliminates the above-described prior extra structural drive member that has high resistance to both tension and compressive forces.

Although the foregoing has been described in some detail for purposes of clarity or understanding, it will be appreciated that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method of moving sludge material along a floor of a basin, comprising the operations of:

defining a first space for a portion of the sludge material, the first space having a first volume and being adjacent to the floor, and having at least one corner defined by intersecting adjacent walls;

reducing the first volume of the first space by moving a first pusher and a second pusher into the first volume relative to each other to push a first spillover volume of the portion of the sludge material out of the reduced first volume past the second pusher in a first direction; and whereby the first pusher and second pusher move in opposite directions to push sludge past one of said first and second pushers and in a manner so as to push sludge out of said at least one corner.

2. A method as recited in claim 1, wherein the first spillover volume pushed past the second pusher enters a second space having a second volume, the method comprising the operation of:

reducing the second volume of the second space by moving the second pusher in the first direction and by moving in a second direction opposite to the first direction a third, the movements being into the second volume with the second and third pushers moving relative to each other to push a second spillover volume of the material in the first direction and out of the second volume past the third pusher.

3. A method as recited in claim 2, wherein:

according to a length of the floor of the basin across which the material is to be moved, defining a plurality of the first and second volumes by providing a plurality of the pushers comprising spaced ones of the first and second and third pushers and fourth and fifth and more spaced pushers as necessary to define the volumes extending across the length of the floor across which the material is to be moved;

the reducing of the first volume between the first and second pushers and reducing of a similar first volume between the third and fourth pushers occurs alternately with the reducing of the second volume between the second and third pushers and reducing of a similar second volume between the fourth and fifth pushers;

the alternating reducing of the first and second volumes is effective to push successive spillover volumes over the second pusher and over the third pusher and over the fourth pusher and over the remaining provided pushers until the material is across the length of the floor across which the material is to be moved.

4. A method as recited in claim 1, wherein the operations of reducing the first and second volumes are repeated alternately so that the first volume is reduced simultaneously with an enlarging of the second volume and the second volume is reduced simultaneously with an enlarging of the first volume.

5. A method of moving material along a floor of a basin, comprising the operations of:

defining a first space for a portion of the material, the first space having a first volume and being adjacent to the floor; and reducing the first volume of the first space by moving a first pusher and a second pusher into the first volume relative to each other to push a first spillover volume of the portion of the material out of the reduced first volume past the second pusher in a first direction;

the moving of the material along the floor of the basin comprises moving the material away from a corner of the basin, the corner being defined by intersecting walls;

the operation of defining the first space comprises defining the first space with the first volume adjacent to the walls; and the operation of reducing the first volume of the first space comprises an operation of pulling on sections of an endless cable that extends around spaced pulleys, the reducing of the first volume being by pulling on a first of the sections that is secured to the second pusher to move the first section and the second pusher toward the walls, the reducing of the first volume being further by an operation of the first section pulling on a second of the sections that is secured to the first pusher to move the second section and the first pusher away from the walls to reduce the first volume and push the first spillover volume of the material out of the reduced first volume past the second pusher in the first direction and to a location away from the corner.

6. A method of moving sludge from a first location in a settler basin toward a second location in the settler basin, the first and second locations being spaced in a first desired sludge movement direction, the method comprising the operations of:

pushing some of the sludge from the first location, the pushing being in the first direction and onto a first pusher; and at the same time as the pushing, moving the first pusher in a direction opposite to the first direction into the pushed some of the sludge;

the pushing of some of the sludge being to push the some of the sludge in the first direction past the first pusher toward the second location, wherein the pushing of the sludge comprises moving the sludge away from a corner of the basin, the corner being defined by intersecting walls.

7. A method as recited in claim 6, wherein:

the moving is further to a third location beyond the second location;

the method comprising the further operations of:

using the first pusher to further push the some of the sludge from the second location further in the first direction and onto a second pusher; and at the same time as the further pushing, moving the second pusher in a direction opposite to the first direction into the further pushed some of the sludge;

the further pushing of some of the sludge being to push the some of the sludge in the first direction past the second pusher toward the third location.

8. A method of moving sludge from a first location in a settler basin toward a second location in the settler basin, the first and second locations being spaced in a first desired sludge movement direction, the method comprising the operations of:

pushing some of the sludge from the first location, the pushing being in the first direction and onto a first pusher; and at the same time as the pushing, moving the first pusher in a direction opposite to the first direction into the pushed some of the sludge;

the pushing of some of the sludge being to push the some of the sludge in the first direction past the first pusher toward the second location;

the first location in the settler basin is in a corner defined by an intersection of two adjacent walls of the basin, the second location in the settler basin is away from the walls and out of the corner;

the method comprises the further operations of:

mounting a first pulley against one of the walls and spaced from the corner;

mounting a second pulley against the other of the walls and spaced from the corner;

for the pushing operation, performing the operations of:
mounting an endless tensile member around the first and second pulleys and configuring a first section of the member to push the sludge and configuring a second section of the member as the first pusher; and pulling on the second section in a direction opposite to the first direction to cause the endless tensile member to move the first section in the first direction and push the some of the sludge from the first location toward the second location, the pushing being in the first direction and onto the first pusher;

the pulling on the second section being effective to move the first pusher in the direction opposite to the first direction into the pushed some of the sludge;

the pushing of the some of the sludge by the first section pushing the some of the sludge in the first direction past the second section and past the first pusher toward the second location.

9. A method of collecting, via a series of plate settlers, and further moving sludge along a floor of a settler basin, the method comprising the operations of:

providing a first and a second sludge mover blade, each of the blades being configured elongated with a right-triangular cross-section so that a pusher edge and an inclined edge meet at an acute angle;

arranging the first and second blades in parallel relationship with the pusher edge of the first blade opposed to the inclined edge of the second blade to define a first space; and causing relative movement of each of the first and second blades both toward and away from each other in the basin and along the floor in a common plane to alternately make the first space between the blades larger and smaller, wherein the moving of sludge along the floor of the basin comprises moving the sludge away from a corner of the basin, the corner being defined by intersecting walls.

10. A method as recited in claim 9, wherein during the operation of causing relative movement to make the space smaller, the opposed first and second blades are effective to move the sludge across and past the inclined edge of the second blade.

11. A method as recited in claim 9, wherein:

the providing operation further provides a third sludge mover blades, the third sludge mover blade being configured elongated with a right-triangular configuration so that a pusher edge and an inclined edge meet at an acute angle;

the arranging operation arranges the second and third blades in parallel relationship, the inclined edge of the third blade being adjacent to the pusher edge of the second blade to define a second space; and during the operation of causing relative movement to make the first space larger, the second and third blades are effective to move the sludge across and past the inclined edge of the third blade.

12. A method of moving sludge collected by one or more plate settlers along a floor of a basin, comprising the operations of:

providing a first tensile structure connected to a first group of sludge mover blades adjacent to the floor;

providing a second tensile structure connected to a second group of sludge mover blades adjacent to the floor, the blades of the first group alternating with the blades of the second group in a common plane adjacent to the floor;

connecting a cable between the first tensile structure and the second tensile structure;

extending the cable 180 degrees around an idler pulley with the first tensile structure connected to the cable on one side of the idler pulley and the second tensile structure connected to the cable on another side of the idler pulley;

pulling on the first tensile structure to move the first group of sludge mover blades in a first direction, the first tensile structure pulling on the cable and the cable pulling on the second tensile structure to move the second group of sludge mover blades in a second direction opposite to movement of the first group of sludge mover blades, the moving groups of blades moving the sludge along the floor in the first direction; and wherein the moving of sludge along the floor of the basin comprises moving the sludge away from a corner of the basin, the corner being defined by intersecting walls.

13. A method of moving sludge formed from the collection of debris via at least one plate settler out of a corner of a basin, the corner being defined by adjacent walls, the method comprising the operations of:

providing a first tensile structure connected to a first sludge mover blade adjacent to the floor;

providing a second tensile structure connected to a second sludge mover blade adjacent to the floor, the first and second blades being adjacent to each other in a common plane that is adjacent to the floor;

connecting the first and second tensile structures to each other to define an endless loop;

extending the loop around spaced pulleys, a first pulley being adjacent to a first of the walls and a second of the pulleys being adjacent to a second of the walls, the loop being loose around the pulleys to define slack in the loop;

pulling on the first tensile structure toward the walls to tighten the slack and move the first sludge mover blade into the corner to push sludge against the walls and over the first sludge mover blade away from the walls, the pulled first tensile structure pulling tightly around the pulleys and on the second tensile structure to further tighten the slack and move the second sludge mover blade away from the first sludge mover blade, pulling on the second tensile structure to move the second sludge mover blade toward the first sludge mover blade, the pulled second tensile structure pulling around the pulleys and on the first tensile structure to move the first sludge mover blade toward the second sludge mover blade, the moving blades pushing sludge over the second sludge mover blade away from the walls; and pulling on the first tensile structure toward the walls, the pulled first tensile structure pulling around the pulleys and on the second tensile structure to move the second tensile structure and the second sludge mover blade to push the sludge out of the corner.

* * * * *